United States Patent
LeBoeuf et al.

(10) Patent No.: US 7,026,034 B2
(45) Date of Patent: Apr. 11, 2006

(54) PROCESSING SUBSTRATE AND METHOD OF MANUFACTURING SAME

(75) Inventors: William E. LeBoeuf, Midland, MI (US); William D. Price, Midland, MI (US); Virginia D. Karul, Racine, WI (US)

(73) Assignee: S.C. Johnson Home Storage, Inc., Racine, WI (US)

( * ) Notice: Subject to any disclaimer, the term of this patent is extended or adjusted under 35 U.S.C. 154(b) by 0 days.

(21) Appl. No.: 10/364,598

(22) Filed: Feb. 11, 2003

(65) Prior Publication Data

US 2004/0157041 A1 Aug. 12, 2004

(51) Int. Cl.
*B32B 3/10* (2006.01)

(52) U.S. Cl. ............... 428/137; 428/131; 428/138; 428/911; 269/289 R

(58) Field of Classification Search ........... 428/131, 428/137, 138, 911; 269/289 R; 604/358, 604/367, 374; 426/106, 124, 129; 206/204, 206/205
See application file for complete search history.

(56) References Cited

U.S. PATENT DOCUMENTS

| | | | |
|---|---|---|---|
| 1,481,971 A | 1/1924 | Whiting | 95/91 |
| 1,814,485 A | 7/1931 | Moss | 426/283 |
| 2,001,389 A | 5/1935 | Kratz | 18/57 |
| 2,226,186 A | 12/1940 | Derhoef | 18/15 |
| 2,593,592 A | 4/1952 | Miller | 99/446 |
| 2,757,478 A | 8/1956 | Borland | 248/346.11 |
| 2,778,324 A | 1/1957 | Mattson | 107/46 |
| 2,819,981 A | 1/1958 | Schornstheimer | 117/11 |
| 2,935,107 A | 5/1960 | Bertelsen et al. | 146/215 |
| 2,936,814 A | 5/1960 | Yakubik | 264/271.1 |
| 2,962,414 A | 11/1960 | Arledter | 162/145 |
| 2,962,415 A | 11/1960 | Arledter | 162/145 |
| 2,984,869 A | 5/1961 | O'Conor et al. | 18/48 |
| 3,026,209 A | 3/1962 | Niblack et al. | 426/124 |
| 3,030,251 A | 4/1962 | La Bore et al. | 428/40.1 |
| 3,040,949 A | 6/1962 | Foote | 229/407 |
| 3,043,301 A | 7/1962 | Plantinga et al. | 128/156 |
| 3,060,515 A | 10/1962 | Corbett | 18/48 |
| 3,165,432 A | 1/1965 | Plaskett | 156/244 |

(Continued)

FOREIGN PATENT DOCUMENTS

DE 1 972 165 11/1967

(Continued)

OTHER PUBLICATIONS

International Search Report dated Jul. 7, 2003 Appl. No. PCT/US03/03957.

(Continued)

*Primary Examiner*—Alicia Chevalier

(57) ABSTRACT

A disposable cutting sheet for cutting and preparation of food items thereon includes a first section having a plurality of apertures therethrough and a cut resistant surface, a second liquid impermeable section disposed adjacent the first section, and a fold line disposed between the first section and the second section, wherein folding along the fold line forms the cutting sheet. The cutting sheet further includes an absorbent material, wherein the first and second sections are folded along the fold line and moved relative to one another to form a pocket therebetween such that the absorbent material is disposed in the pocket between the first and second sections. One of a surface of the first section that faces the absorbent material in a folded position and a surface of the second section that faces the absorbent material in a folded position is roughened or textured in order to prevent slippage of the absorbent material within the sheet when folded.

23 Claims, 23 Drawing Sheets

U.S. PATENT DOCUMENTS

Figure 1A:
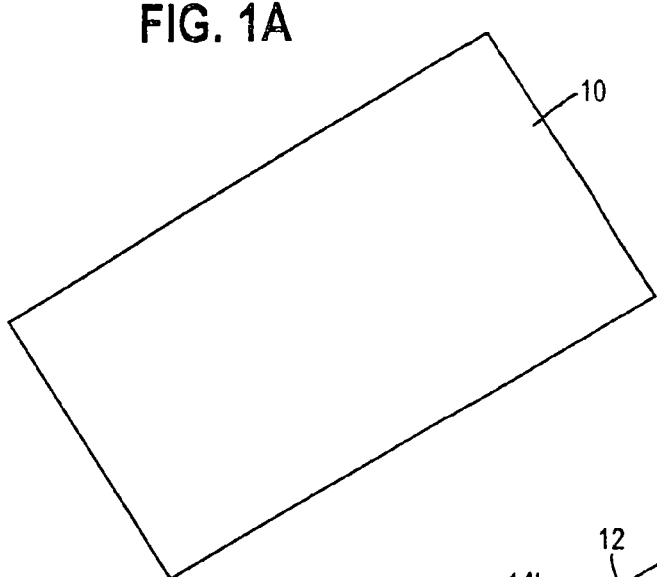

| | | | |
|---|---|---|---|
| 3,184,373 A | 5/1965 | Arledter | 162/152 |
| 3,209,978 A | 10/1965 | Dupuis | 206/205 |
| 3,223,567 A | 12/1965 | Trewella | 156/253 |
| 3,325,345 A | 6/1967 | Hider | 162/169 |
| 3,376,238 A | 4/1968 | Gregorian et al. | 260/2.5 |
| 3,418,396 A | 12/1968 | Edwards et al. | 260/897 |
| 3,441,021 A | 4/1969 | Endres | 128/156 |
| 3,448,913 A | 6/1969 | Wolff | 229/14 |
| 3,484,835 A | 12/1969 | Trounstine et al. | 161/130 |
| 3,515,331 A | 6/1970 | Guthrie, Sr. | 229/14 |
| 3,517,407 A | 6/1970 | Wyant | 15/215 |
| 3,540,959 A | 11/1970 | Connor | 156/203 |
| 3,575,764 A | 4/1971 | McFarren | 156/309 |
| 3,628,720 A | 12/1971 | Schmedding | 229/55 |
| 3,640,829 A | 2/1972 | Elton | 161/129 |
| 3,649,426 A | 3/1972 | Gates, Jr. | 161/43 |
| 3,678,933 A | 7/1972 | Moore et al. | 128/296 |
| 3,684,641 A | 8/1972 | Murphy | 161/129 |
| 3,685,643 A | 8/1972 | Garshelis | 206/57 |
| 3,698,933 A | 10/1972 | Leeks et al. | 117/72 |
| 3,710,797 A | 1/1973 | Marsan | 128/284 |
| 3,724,464 A | 4/1973 | Enloe | 128/284 |
| 3,785,451 A * | 1/1974 | McCord | 180/69.1 |
| 3,835,756 A | 9/1974 | Bosse | 93/8 WA |
| 3,837,634 A | 9/1974 | Cobb | 269/289 |
| 3,848,595 A | 11/1974 | Endress | 128/284 |
| 3,856,610 A | 12/1974 | Bruneel | 161/43 |
| 3,859,161 A | 1/1975 | McLeod | 161/44 |
| 3,870,593 A | 3/1975 | Elton et al. | 161/159 |
| 3,888,248 A | 6/1975 | Moore et al. | 128/156 |
| 3,929,135 A | 12/1975 | Thompson | 128/287 |
| 3,937,648 A | 2/1976 | Huebner et al. | 162/168 R |
| 3,945,386 A | 3/1976 | Anczurowski et al. | 128/287 |
| 3,950,578 A | 4/1976 | Laumann | 427/378 |
| 3,967,623 A | 7/1976 | Butterworth et al. | 128/287 |
| 3,993,718 A | 11/1976 | Bontinck et al. | 264/22 |
| 4,035,543 A | 7/1977 | Draper et al. | 428/245 |
| 4,064,300 A | 12/1977 | Bhangu | 428/120 |
| 4,096,309 A | 6/1978 | Stillman | 428/285 |
| 4,116,426 A | 9/1978 | Kessler | 269/307 |
| 4,123,417 A | 10/1978 | Finberg | 260/42.46 |
| 4,128,686 A | 12/1978 | Kyle et al. | 428/219 |
| 4,192,494 A | 3/1980 | Mima | 269/289 R |
| 4,225,383 A | 9/1980 | McReynolds | 162/156 |
| 4,243,619 A | 1/1981 | Fraser et al. | 264/40.6 |
| 4,246,305 A | 1/1981 | Delattre | 428/36 |
| 4,252,516 A | 2/1981 | Raley et al. | 425/290 |
| 4,275,811 A | 6/1981 | Miller | 206/204 |
| 4,276,338 A | 6/1981 | Ludwa et al. | 428/137 |
| 4,311,479 A | 1/1982 | Fenn et al. | 8/495 |
| 4,316,070 A | 2/1982 | Prosise et al. | 219/10.55 E |
| 4,328,275 A | 5/1982 | Vargo | 428/156 |
| 4,338,366 A | 7/1982 | Evans et al. | 428/76 |
| 4,359,553 A | 11/1982 | Edwards | 525/240 |
| 4,364,723 A | 12/1982 | Louis et al. | 425/384 |
| 4,364,787 A | 12/1982 | Radzins | 156/164 |
| 4,378,404 A | 3/1983 | Liu | 428/290 |
| 4,378,451 A | 3/1983 | Edwards | 525/240 |
| 4,379,192 A | 4/1983 | Wahlquist et al. | 428/156 |
| 4,379,808 A | 4/1983 | Cole et al. | 428/438 |
| 4,382,507 A | 5/1983 | Miller | 206/204 |
| 4,410,578 A | 10/1983 | Miller | 428/117 |
| 4,412,036 A | 10/1983 | Pedersen et al. | 525/54.26 |
| 4,414,255 A | 11/1983 | Tokuyama et al. | 428/154 |
| 4,430,284 A | 2/1984 | Rasmussen | 264/171 |
| 4,438,167 A | 3/1984 | Schwarz | 428/138 |
| 4,440,385 A | 4/1984 | Kingery | 269/13 |
| 4,450,195 A | 5/1984 | Hagbjer | 428/178 |
| 4,467,012 A | 8/1984 | Pedersen et al. | 428/248 |
| 4,487,796 A | 12/1984 | Lloyd et al. | 428/154 |
| 4,507,351 A | 3/1985 | Johnson et al. | 428/198 |
| 4,518,643 A | 5/1985 | Francis | 428/131 |
| 4,528,312 A | 7/1985 | Edwards | 524/232 |
| 4,587,152 A | 5/1986 | Gleichenhagen et al. | 428/195 |
| 4,589,940 A | 5/1986 | Johnson | 156/78 |
| 4,608,115 A | 8/1986 | Schroth et al. | 156/519 |
| 4,610,751 A | 9/1986 | Eschler | 156/517 |
| 4,614,679 A | 9/1986 | Farrington, Jr. et al. | 428/138 |
| 4,636,424 A | 1/1987 | Amemiya et al. | 428/198 |
| 4,643,727 A | 2/1987 | Rosenbaum | 604/369 |
| 4,649,909 A | 3/1987 | Thompson | 602/42 |
| 4,653,737 A | 3/1987 | Haskins et al. | 269/13 |
| 4,657,133 A | 4/1987 | Komatsu et al. | 206/204 |
| 4,667,665 A | 5/1987 | Blanco et al. | 128/156 |
| 4,705,809 A | 11/1987 | Dighton et al. | 521/62 |
| 4,723,953 A | 2/1988 | Rosenbaum et al. | 604/369 |
| 4,726,876 A | 2/1988 | Tomsovic, Jr. | 156/552 |
| 4,726,977 A | 2/1988 | Goldstein et al. | 428/138 |
| 4,735,846 A | 4/1988 | Larsonneur | 428/198 |
| 4,737,402 A | 4/1988 | Harpell et al. | 428/252 |
| 4,755,413 A | 7/1988 | Morris | 428/138 |
| 4,756,939 A * | 7/1988 | Goodwin | 428/74 |
| 4,769,109 A | 9/1988 | Tellvik et al. | 162/123 |
| 4,769,274 A | 9/1988 | Tellvik et al. | 428/218 |
| 4,770,920 A | 9/1988 | Larsonneur | 428/198 |
| 4,786,346 A | 11/1988 | Ales et al. | 156/160 |
| 4,787,597 A | 11/1988 | Yokota et al. | 249/113 |
| 4,808,675 A | 2/1989 | Twilley et al. | 525/408 |
| 4,838,253 A | 6/1989 | Brassington et al. | 128/156 |
| 4,847,142 A | 7/1989 | Twilley et al. | 428/252 |
| 4,859,259 A | 8/1989 | Scheibner | 156/66 |
| 4,861,632 A | 8/1989 | Caggiano | 428/35.2 |
| 4,865,855 A | 9/1989 | Hansen et al. | 426/124 |
| 4,878,765 A | 11/1989 | Watkins et al. | 383/116 |
| 4,892,782 A | 1/1990 | Fisher et al. | 428/240 |
| 4,898,761 A | 2/1990 | Dunaway et al. | 428/137 |
| 4,921,702 A | 5/1990 | Banks et al. | 424/404 |
| 4,929,480 A | 5/1990 | Midkiff et al. | 428/35.6 |
| 4,935,276 A | 6/1990 | Pawlowski et al. | 428/35.7 |
| 4,935,282 A * | 6/1990 | Pawlowski et al. | 428/121 |
| 4,946,539 A | 8/1990 | Ales et al. | 156/495 |
| 4,948,653 A | 8/1990 | Dinter et al. | 428/172 |
| 4,950,524 A | 8/1990 | Hacker | 428/163 |
| 4,950,526 A | 8/1990 | Singleton | 428/166 |
| 4,957,805 A | 9/1990 | Biggs et al. | 428/223 |
| 4,961,930 A | 10/1990 | Perdelwitz, Jr., et al. | 424/411 |
| 4,977,031 A | 12/1990 | Temple | 428/463 |
| 4,984,907 A | 1/1991 | Power | 383/109 |
| 4,988,471 A | 1/1991 | Millevoi et al. | 264/211.12 |
| 5,000,341 A | 3/1991 | Shirota | 220/452 |
| 5,028,332 A | 7/1991 | Ohnishi | 210/500.34 |
| 5,041,325 A | 8/1991 | Larson et al. | |
| 5,055,332 A | 10/1991 | Rhodes et al. | 428/74 |
| 5,082,721 A | 1/1992 | Smith, Jr. et al. | 428/252 |
| 5,085,416 A | 2/1992 | Miyake et al. | 269/289 |
| 5,093,164 A | 3/1992 | Bauer et al. | 428/35.4 |
| 5,093,176 A * | 3/1992 | Pribonic et al. | 428/76 |
| 5,096,722 A | 3/1992 | Bair | 426/107 |
| 5,102,485 A | 4/1992 | Keeler et al. | 156/256 |
| 5,106,696 A | 4/1992 | Chundury et al. | 428/517 |
| 5,116,661 A | 5/1992 | Matsubara | 428/198 |
| 5,119,512 A | 6/1992 | Dunbar et al. | 2/167 |
| 5,124,519 A | 6/1992 | Roy et al. | 219/10.55 E |
| 5,141,794 A | 8/1992 | Arroyo | 428/138 |
| 5,151,314 A | 9/1992 | Brown | 428/198 |
| 5,154,960 A | 10/1992 | Mucci et al. | 428/68 |
| 5,162,148 A | 11/1992 | Boye et al. | 428/287 |
| 5,176,930 A | 1/1993 | Kannankeril et al. | 426/124 |
| 5,198,162 A | 3/1993 | Park et al. | 264/49 |
| 5,200,263 A | 4/1993 | Gould et al. | 428/323 |
| 5,203,548 A | 4/1993 | Sanders | 269/302.1 |
| D336,580 S | 6/1993 | White et al. | D6/518 |
| 5,215,627 A | 6/1993 | Willis et al. | 162/156 |
| 5,241,149 A | 8/1993 | Watanabe et al. | 219/10.55 E |

| | | | | | | |
|---|---|---|---|---|---|---|
| 5,261,899 A | 11/1993 | Visscher et al. ............. 604/367 | | 5,928,210 A | 7/1999 | Ouellette et al. ........... 604/383 |
| 5,270,089 A | 12/1993 | Alston et al. .................. 428/60 | | 5,938,185 A | 8/1999 | Kletter ................... 269/289 R |
| 5,288,349 A | 2/1994 | Fink ............................ 156/72 | | 5,941,863 A | 8/1999 | Guidotti et al. ............. 604/378 |
| 5,301,806 A | 4/1994 | Olson ........................ 206/278 | | 5,948,707 A | 9/1999 | Crawley et al. ............. 442/101 |
| 5,310,587 A | 5/1994 | Akahori et al. ............. 428/35.2 | | 5,948,711 A | 9/1999 | Closson ..................... 442/398 |
| 5,320,895 A | 6/1994 | Larsonneur et al. ........ 428/137 | | 5,965,235 A | 10/1999 | McGuire et al. ............ 428/156 |
| 5,328,450 A | 7/1994 | Smith et al. .................. 602/59 | | 5,968,633 A | 10/1999 | Hamilton et al. ............ 428/174 |
| 5,338,406 A | 8/1994 | Smith ...................... 162/168.2 | | 5,984,294 A | 11/1999 | Bogomolny ............ 269/289 R |
| 5,368,909 A | 11/1994 | Langdon et al. ............. 428/137 | | 5,997,989 A | 12/1999 | Gessner et al. |
| 5,368,927 A | 11/1994 | Lesca et al. ................. 428/287 | | 5,998,039 A | 12/1999 | Tanizaki et al. ............. 428/516 |
| 5,376,322 A | 12/1994 | Younessian .................. 264/148 | | 6,005,053 A | 12/1999 | Parikh et al. ................ 525/221 |
| 5,376,392 A | 12/1994 | Ikegami et al. ............. 426/127 | | 6,021,524 A | 2/2000 | Wu et al. ....................... 2/167 |
| 5,386,978 A | 2/1995 | Ladwig ................... 269/289 R | | 6,022,443 A | 2/2000 | Rajala et al. ................ 156/302 |
| 5,405,008 A | 4/1995 | Tanaka et al. ............ 206/459.5 | | 6,037,022 A | 3/2000 | Adur et al. ................. 128/34.3 |
| 5,407,612 A | 4/1995 | Gould et al. .................. 264/24 | | 6,037,281 A | 3/2000 | Mathis et al. |
| 5,414,248 A | 5/1995 | Phillips ...................... 219/730 | | 6,042,844 A | 3/2000 | Ishida et al. ................. 424/443 |
| 5,433,424 A | 7/1995 | Watanabe ................ 269/289 R | | 6,046,254 A | 4/2000 | Kneale ........................ 523/169 |
| 5,460,884 A | 10/1995 | Kobylivker et al. ........ 428/373 | | 6,050,517 A | 4/2000 | Dobrescu et al. ......... 242/417.2 |
| 5,472,790 A | 12/1995 | Thompson .................. 428/500 | | RE36,717 E | 5/2000 | Thompson .................. 426/518 |
| 5,480,693 A | 1/1996 | Patterson et al. ........... 428/36.7 | | 6,066,375 A | 5/2000 | Shanton ...................... 428/35.7 |
| 5,485,937 A | 1/1996 | Tseng ......................... 220/571 | | 6,079,555 A | 6/2000 | Posson ........................ 206/204 |
| 5,500,270 A | 3/1996 | Langdon et al. ............. 428/119 | | 6,080,474 A | 6/2000 | Oakley et al. ............... 428/323 |
| 5,501,886 A | 3/1996 | Hammer et al. ............. 428/34.8 | | 6,103,141 A | 8/2000 | Incorvia et al. .............. 252/194 |
| 5,520,945 A * | 5/1996 | Coggins ..................... 426/496 | | 6,114,456 A | 9/2000 | Dewart et al. ............... 525/240 |
| 5,536,555 A | 7/1996 | Zelazoski et al. ........... 428/138 | | 6,152,025 A | 11/2000 | Oien et al. |
| 5,556,504 A | 9/1996 | Rajala et al. ................ 156/519 | | 6,153,701 A | 11/2000 | Potnis et al. ................. 525/191 |
| 5,562,872 A | 10/1996 | Watanabe .................... 264/145 | | 6,158,579 A | 12/2000 | Rosenbaum ............ 206/45.29 |
| 5,565,258 A | 10/1996 | McConnell et al. ......... 428/122 | | 6,164,478 A | 12/2000 | Cant ........................ 220/62.1 |
| 5,568,657 A | 10/1996 | Cordova et al. ................ 2/167 | | 6,171,695 B1 | 1/2001 | Fontenot et al. ............. 428/337 |
| 5,580,423 A | 12/1996 | Ampulski et al. ....... 162/111.7 | | 6,180,037 B1 | 1/2001 | Andersen et al. ............. 264/108 |
| 5,585,420 A | 12/1996 | Grasmeder et al. ......... 523/400 | | 6,180,584 B1 | 1/2001 | Sawan et al. ................ 510/382 |
| 5,591,227 A | 1/1997 | Dinh et al. ...................... 623/1 | | 6,206,445 B1 | 3/2001 | Brooks .......................... 296/51 |
| 5,592,690 A | 1/1997 | Wu ................................ 2/67 | | 6,221,382 B1 | 4/2001 | Ishida et al. ................. 424/443 |
| 5,605,739 A | 2/1997 | Stokes et al. ................ 428/198 | | 6,227,541 B1 | 5/2001 | Couillard et al. ............. 271/307 |
| 5,607,745 A | 3/1997 | Ogden ........................ 428/138 | | 6,228,062 B1 | 5/2001 | Howell et al. ................ 604/171 |
| 5,607,798 A | 3/1997 | Kobylivker et al. ........ 443/381 | | 6,238,767 B1 | 5/2001 | McCormack et al. |
| 5,613,427 A | 3/1997 | Wiley ........................ 99/446 | | 6,268,438 B1 | 7/2001 | Ellul et al. ................... 525/240 |
| 5,614,283 A | 3/1997 | Potnis et al. ................. 428/131 | | 6,270,878 B1 | 8/2001 | Wegele et al. ............... 428/195 |
| 5,641,828 A | 6/1997 | Sadatoshi et al. ............ 524/451 | | 6,271,155 B1 | 8/2001 | Noma et al. |
| 5,645,933 A | 7/1997 | Sakazume et al. ........... 442/290 | | 6,274,232 B1 * | 8/2001 | Otten et al. .............. 428/315.9 |
| 5,652,041 A | 7/1997 | Buerger et al. ............. 428/198 | | 6,328,722 B1 | 12/2001 | Lavash et al. ......... 604/385.04 |
| 5,652,051 A | 7/1997 | Shawver et al. ............ 442/362 | | 6,329,565 B1 | 12/2001 | Dutkiewicz et al. ......... 604/378 |
| 5,662,758 A | 9/1997 | Hamilton et al. ........... 156/221 | | 6,346,575 B1 | 2/2002 | Debras et al. ................ 525/191 |
| 5,662,978 A | 9/1997 | Brown et al. .................. 428/57 | | 6,383,614 B1 | 5/2002 | Carson et al. ............... 428/206 |
| 5,674,342 A | 10/1997 | Obijeski et al. ........ 156/244.11 | | 6,383,615 B1 | 5/2002 | Otten et al. .................. 428/206 |
| 5,693,405 A | 12/1997 | Harvie et al. ................ 428/156 | | 6,391,467 B1 | 5/2002 | DeLisio et al. .............. 428/516 |
| 5,695,376 A | 12/1997 | Datta et al. .................. 442/334 | | 6,391,806 B1 | 5/2002 | Carson et al. ............... 442/327 |
| 5,698,290 A | 12/1997 | Fukushima et al. ......... 428/138 | | 6,416,817 B1 | 7/2002 | Rangwalla et al. .......... 427/377 |
| 5,709,897 A | 1/1998 | Pearlstein ................... 429/106 | | 6,422,551 B1 | 7/2002 | Brotz ...................... 269/289 R |
| 5,714,229 A | 2/1998 | Ogden ........................ 428/138 | | 6,433,095 B1 | 8/2002 | Laurent ....................... 525/240 |
| 5,716,478 A | 2/1998 | Boothe et al. ................ 156/478 | | 6,436,218 B1 | 8/2002 | Sher et al. ................... 156/209 |
| 5,718,955 A | 2/1998 | McGuire et al. ............ 428/35.7 | | 6,451,410 B1 | 9/2002 | McGuire et al. ............ 428/156 |
| 5,733,822 A | 3/1998 | Gessner et al. ................ 442/35 | | 6,468,646 B1 | 10/2002 | Carson et al. ........... 428/315.9 |
| 5,744,406 A | 4/1998 | Novak ........................ 442/121 | | D475,206 S | 6/2003 | Ackerman et al. ............. D5/57 |
| RE35,814 E | 6/1998 | Olson ........................ 206/278 | | D475,856 S | 6/2003 | Karul et al. .................... D5/53 |
| 5,759,340 A | 6/1998 | Boothe et al. ................ 156/519 | | 6,579,816 B1 | 6/2003 | Lockett ....................... 442/417 |
| 5,763,337 A | 6/1998 | Montgomery ............... 442/398 | | 6,592,983 B1 | 7/2003 | Carson et al. ............... 428/323 |
| H1738 H | 7/1998 | Reinhart, Jr. .................. 2/49.1 | | 6,617,004 B1 | 9/2003 | Lake et al. .................. 429/138 |
| 5,776,295 A | 7/1998 | Montgomery ............... 156/324 | | 2002/0082540 A1 | 6/2002 | Johnson et al. |
| 5,776,619 A | 7/1998 | Shanton ...................... 428/511 | | 2002/0168532 A1 | 11/2002 | Sinsel et al. ................. 428/461 |
| 5,786,064 A | 7/1998 | Finestone et al. | | 2003/0097915 A1 | 5/2003 | Chen et al. ...................... 83/13 |
| 5,802,610 A | 9/1998 | Burr ............................ 2/49.4 | | | | |
| 5,804,241 A | 9/1998 | Isohata ........................ 426/415 | | FOREIGN PATENT DOCUMENTS | | |
| 5,833,894 A | 11/1998 | Lanzani et al. .............. 264/46.3 | | | | |
| 5,834,104 A | 11/1998 | Cordani ....................... 428/218 | | DE | 91 06 447 | 9/1991 |
| 5,843,260 A | 12/1998 | Huskey ........................ 156/153 | | DE | 40 39 354 | 6/1992 |
| 5,865,822 A | 2/1999 | Hamajima et al. ........... 605/367 | | DE | 43 24 802 | 1/1995 |
| 5,871,607 A | 2/1999 | Hamilton et al. ........... 156/221 | | DE | 196 34 196 | 2/1998 |
| 5,882,464 A | 3/1999 | Theisgen et al. ............ 156/269 | | EP | 0 295 943 | 12/1988 |
| 5,888,604 A | 3/1999 | Evans, Jr. et al. ............. 428/47 | | EP | 0 489 964 | 6/1992 |
| 5,899,444 A | 5/1999 | Rempe ......................... 269/3 | | EP | 0 497 608 | 8/1992 |
| 5,900,306 A | 5/1999 | Stopper | | EP | 0 528 248 | 2/1993 |
| 5,925,406 A | 7/1999 | McGuire et al. .......... 427/208.2 | | EP | 0 537 130 | 4/1993 ................ 4/602 |

| | | | | |
|---|---|---|---|---|
| EP | 0 332 739 | 1/1994 | | |
| EP | 0 673 856 | 9/1995 | | |
| EP | 0 613 834 | 6/1997 | | |
| EP | 0 816 060 | 1/1998 | | |
| EP | 0 905 173 | 3/1999 | ................ | 5/18 |
| EP | 1 035 244 | 9/2000 | | |
| EP | 1 121 396 | 8/2001 | ................ | 123/14 |
| GB | 279149 | 10/1927 | | |
| GB | 1 168 925 | 10/1969 | | |
| GB | 1 390 240 | 4/1975 | | |
| GB | 2 085 756 | 5/1982 | ................ | 1/76 |
| GB | 2 284 047 | 5/1995 | | |
| JP | 54-63972 | 5/1979 | | |
| JP | 64-43506 | 2/1989 | | |
| JP | 10 87315 | 3/1989 | ................ | 43/20 |
| JP | 030 382 49 | 1/1991 | | |
| JP | 4 135 321 | 12/1992 | | |
| JP | 5178377 | 7/1993 | | |
| JP | 52-77037 | 10/1993 | | |
| JP | 5305978 | 11/1993 | | |
| JP | 60-57610 | 3/1994 | | |
| JP | 62-37870 | 8/1994 | | |
| JP | 70-51169 | 2/1995 | | |
| JP | 7 235 42 | 5/1995 | | |
| JP | 072 518 76 | 10/1995 | | |
| JP | 080 528 41 | 2/1996 | | |
| JP | 082 057 62 | 8/1996 | | |
| JP | 83-32154 | 12/1996 | | |
| JP | 90-10122 | 1/1997 | | |
| JP | 90-23989 | 1/1997 | | |
| JP | 9108126 | 4/1997 | | |
| JP | 92-15613 | 8/1997 | | |
| JP | 10 33396 | 2/1998 | | |
| JP | 100-71094 | 3/1998 | | |
| JP | 101 297 39 | 5/1998 | | |
| JP | 10137140 | 5/1998 | | |
| JP | 101 510 75 | 6/1998 | | |
| JP | 101-65319 | 6/1998 | | |
| JP | 101-85226 | 7/1998 | | |
| JP | 102-16032 | 8/1998 | | |
| JP | 102-76918 | 10/1998 | | |
| JP | 10313776 | 12/1998 | | |
| JP | 11 18971 | 1/1999 | | |
| JP | 110-18970 | 1/1999 | | |
| JP | 112-08734 | 8/1999 | | |
| JP | 2000-041869 | 2/2000 | | |
| WO | WO 91/00835 | 1/1991 | | |
| WO | WO 94/22393 | 10/1994 | | |
| WO | WO 96/13979 | 5/1996 | | |
| WO | WO 96/14038 | 5/1996 | | |
| WO | WO 96/14787 | 5/1996 | | |
| WO | WO 97/10161 | 3/1997 | | |
| WO | WO 97/30909 | 8/1997 | | |
| WO | WO 97/49955 | 12/1997 | | |
| WO | WO 98/51251 | 11/1998 | | |
| WO | WO 99/10164 | 3/1999 | | |
| WO | WO 99/37969 | 7/1999 | | |
| WO | WO 00/05065 | 2/2000 | | |
| WO | WO 02/28577 | 4/2000 | ................ | 123/14 |
| WO | WO 00/29209 | 5/2000 | | |
| WO | WO 00/29311 | 5/2000 | | |
| WO | WO 00/78535 | 12/2000 | | |
| WO | WO 00/78536 | 12/2000 | | |
| WO | WO 00/78537 | 12/2000 | | |
| WO | WO 00/78848 | 12/2000 | | |
| WO | WO 01/26524 | 4/2001 | | |
| WO | WO 01/29301 | 4/2001 | | |
| WO | WO 03/006155 A1 | 1/2003 | | |

OTHER PUBLICATIONS

International Search Report dated Jul. 12, 2004 Appl. No. PCT/US2004/004019.
Written Opinion of the Int'l Search Authority dated Jul. 12, 2004 Appl. No. PCT/US2004/004019.
International Search Report dated Jul. 21, 2004 Appl. No. PCT/US2004/004023.
Written Opinion of the Int'l Search Authority dated Jul. 21, 2004 Appl. No. PCT/US2004/004023.
International Search Report dated Jul. 26, 2004 Appl. No. PCT/US2004/003859.
Written Opinion of the Int'l Search Authority dated Jul. 26, 2004 Appl. No. PCT/US2004/003859.
International Search Report dated Aug. 3, 2004 Appl. No. PCT/US2004/003831.
Written Opinion of the Int'l Search Authority dated Aug. 3, 2004 Appl. No. PCT/US2004/003831.
International Search Report dated Aug. 3,2004 Appl. No. PCT/US2004/003835.
Written Opinion of the Int'l Search Authority dated Aug. 3, 2004 Appl. No. PCT/US2004/003835.
Photograph and English translation of Product Package of Kobayashi Pharmaceutical Co., Ltd. For "Slime and Odor Free Cutting Board Sheet," Jan. 17, 2001.
Website download from www.demarleusa.com for "Silpat," a non-stick silicone baking sheet: DeMarle, Inc., USA, 1982.
Website download from www.cutandtoss.com for "Cut & Toss Disposable Cutting Board," Jun. 2000.
Competitive Information Study for "UniCharm" multipurpose sheets; UniCharm, Japan, Jun. 28, 2000.
Dental Bib advertisement, Graham Dental Products, www.grahamdental.com, May 2001.
International Preliminary Examination Report dated Oct. 1, 2002 Appl. No. PCT/US01/30206.
Dow Corning's Q2-5211 Superwetting Agent Supplier Brochure, (1993) (2 pages).
"Hydrophilic Concentrate-VW 351" Polyvel Supplier Brochure Hammonton, NJ, (1999) (2 pages).
Kulshreshtha et al., "Competitve New Technologies in Polyolefin Synthesis and Materials" *Handbook of Polyolefins, 2nd Ed., Revised & Expanded* (2000) (pp. 1-69).
Imuta et al., "Recent Progress on Single-Site Catalysts" *Handbook of Polyolefins, 2nd Ed., Revised & Expanded* (2000) (pp. 71-88).
www.schwarzflex.com "Corona Treating", (1 page.).
Web pages "Surface Energy (Surface Wetting Capability", NDT Resource Center, (3 Pages.).

* cited by examiner

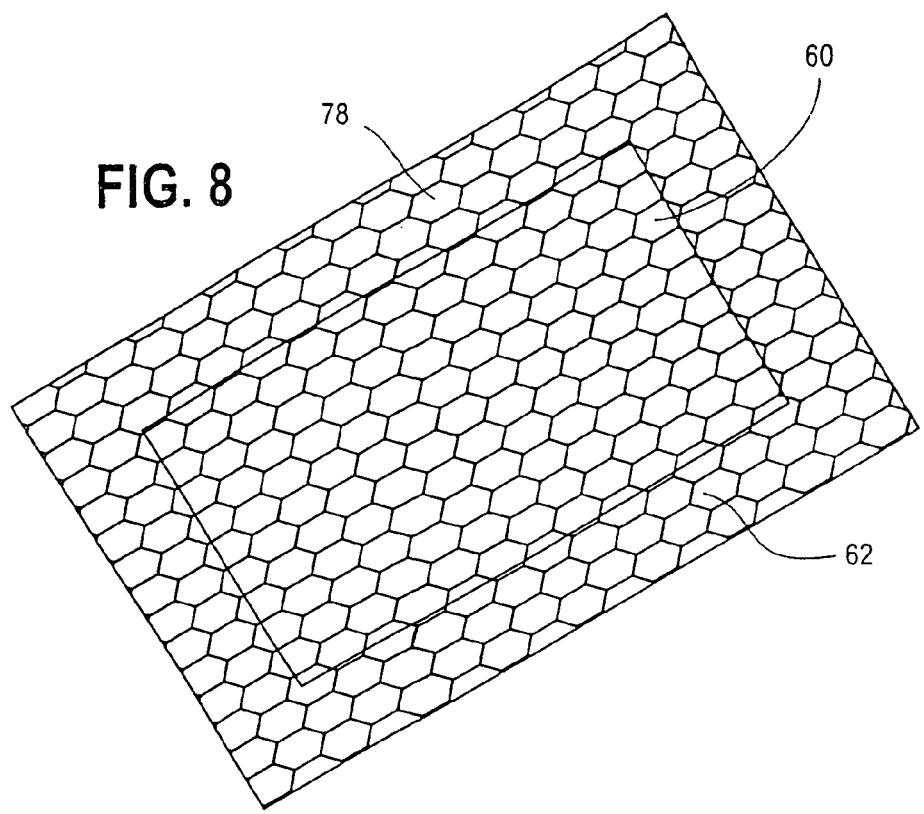
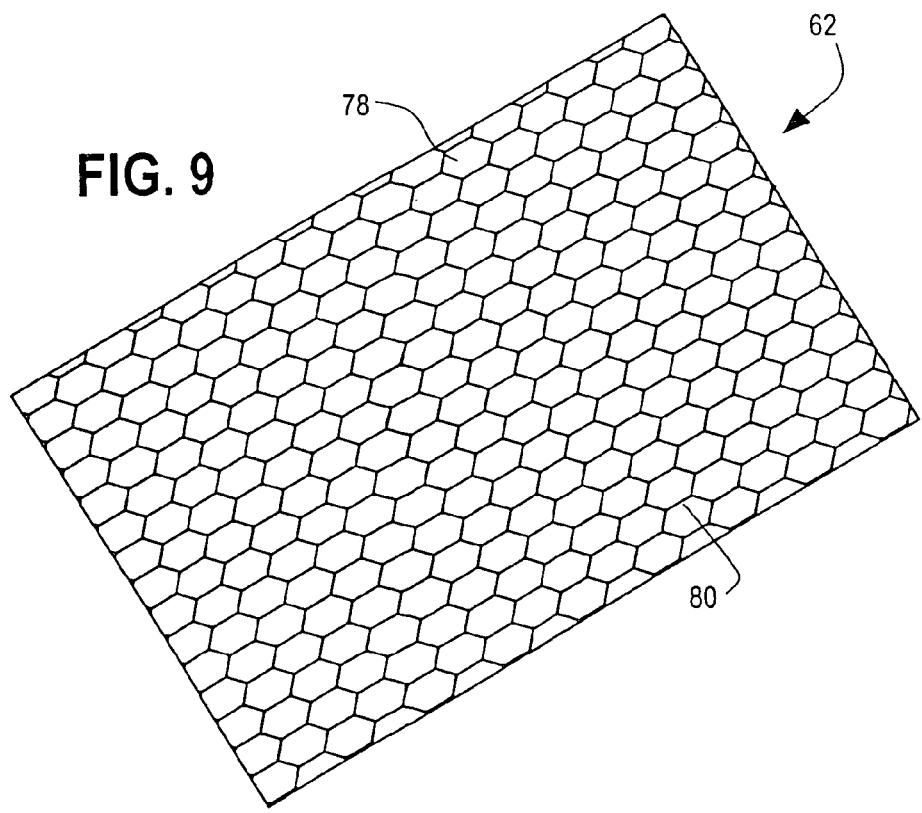

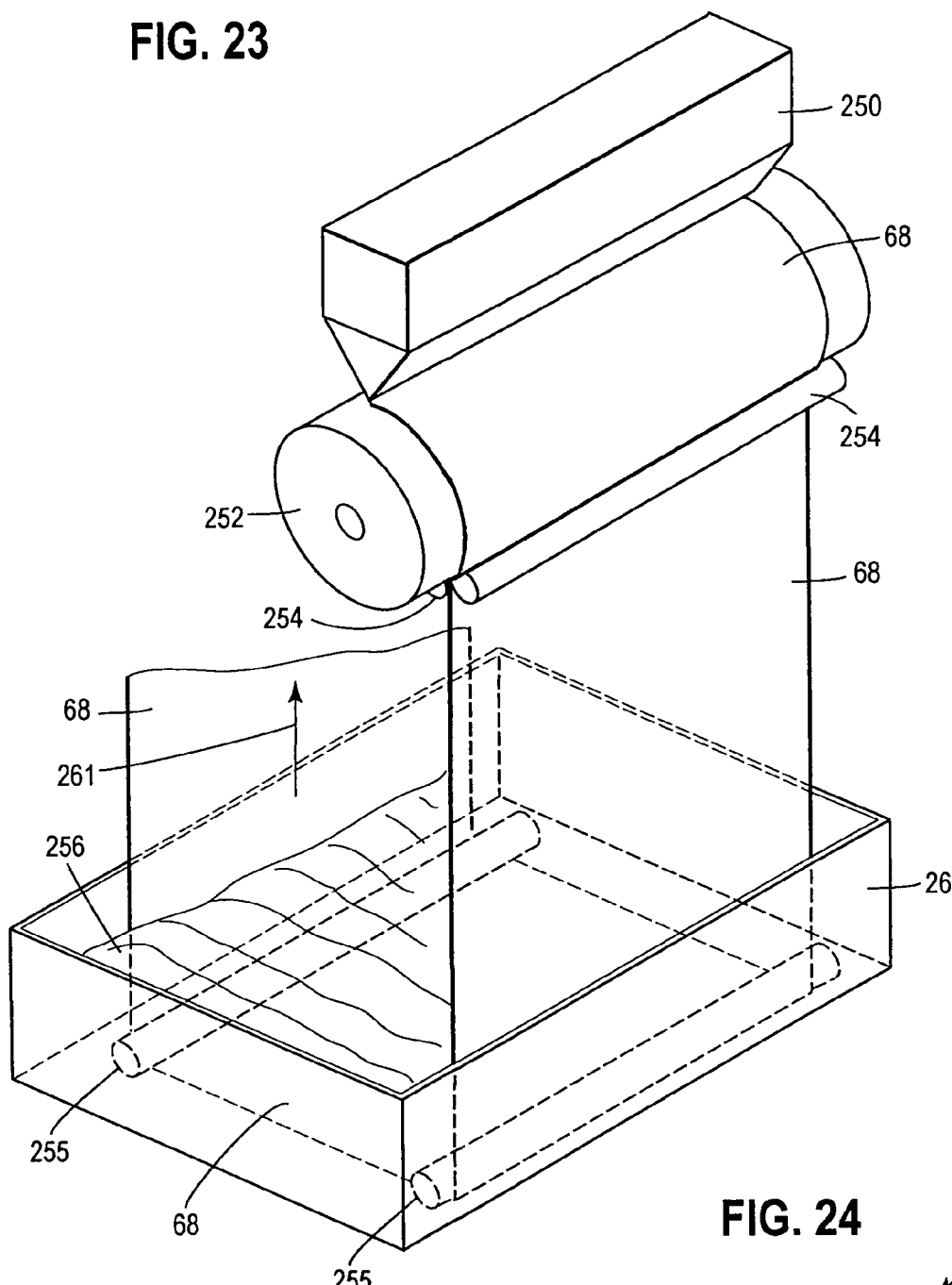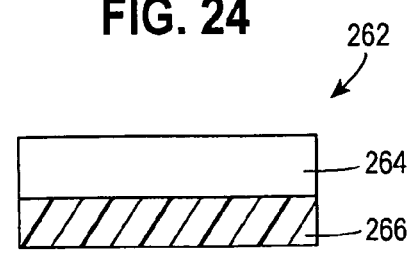

PROCESSING SUBSTRATE AND METHOD OF MANUFACTURING SAME

TECHNICAL FIELD

The present invention relates generally to protective media, and more particularly to a disposable cutting sheet.

BACKGROUND ART

Management of bacteria, liquids, fats and other waste during the preparation and handling of foods is of concern in food handling areas. Typically, such areas include the kitchen, although modern lifestyles include out-of-home occasions such as social and recreational gatherings where food is prepared, transported and/or served outside of the kitchen. Foods of particular concern from the standpoint of possibility of food-borne illness are fish, fowl and ground meats; although all foods present some degree of risk. Current media articles discuss the fact that the common cutting boards used in the preparation of foods are a source of food contamination. Other commonly used food preparation surfaces, such as countertops, also present some risk. Specifically, it has been found that bacteria can become entrapped in surface imperfections of the cutting surface, resulting in a surface that is difficult, if not impossible, to clean and/or sterilize. The cutting surface thus becomes capable of transferring bacteria to other foods, which provides a favorable media for pathogens to proliferate, resulting in an increased potential for food-borne illness, particularly when contact is had with high-risk foods. In fact, some foods considered to be pathogenically low-risk, such as fresh fruits and vegetables can become contaminated, waiting for the right environment for the bacteria to proliferate.

Another issue with cutting boards is the transfer of juices from the cutting board to other surfaces in the kitchen due to the fact that the cutting board is normally not designed to capture and contain juices during the cutting operation and thereafter through final disposal. In addition to the inconvenience of having to clean the countertop or other surface(s) exposed to the juices, a possibility exists that other food items placed on such surface(s) may be cross-contaminated.

Products are in the marketplace today that attempt to address issues of liquid, fat, and bacteria management during cutting and general food preparation. However, these products fall short of optimum in one way or another. Specifically, they do not absorb, are not cut resistant, and/or fail to provide an effective bacteria barrier between the food being handled and the work surface. Also, bacteria are retained which can cause contamination during subsequent use.

In addition to the foregoing, most, if not all, food preparation surfaces lack one or more of the following attributes:
1. a single use, disposable cutting surface that is virtually cut resistant and also entraps and holds waste and bacteria;
2. a food preparation surface which prevents food movement during cutting;
3. a food preparation surface which prevents and/or selectively manages movement thereof on the counter top during cutting;
4. a single-use food preparation surface which is easily disposed of while securely containing contaminants; and
5. a single-use cutting surface that lays flat during use.

Coggins U.S. Pat. No. 5,520,945 discloses a disposable sheet that may be used in food service applications to prevent the cross-contamination of foods and eliminate the need for time-consuming clean-ups. The sheet comprises a porous layer that allows materials such as oil or flour to pass through, an absorbent layer that holds the materials passing through the porous layer, and a barrier layer that ensures that the materials do not contaminate a food preparation surface. The sheet has multiple uses such as for rolling dough, absorbing excess moisture, making sandwiches, cutting breads and condiments, and drawing excess oil away from fried items. The disposable sheet is only disclosed for use with items that do not require aggressive cutting, and hence, is not adapted for use with items that require substantial cutting pressures, such as meats and hard vegetables.

Thompson U.S. Pat. No. Re. 36,717 discloses a flexible preparation and transfer sheet. The sheet comprises a homogeneous structure of polypropylene, with a thickness in a range between 0.010 to 0.030 inch. The sheet may be flexed about a longitudinal centerline whereupon the sheet material develops a cantilever beam strength sufficient to transport food articles after preparation to an appropriate container.

Wu et al. U.S. Pat. No. 6,021,524 discloses a polymeric film having increased cut resistance. The film comprises a polymeric matrix having a plurality of cut resistance fibers dispersed therein. The film is preferably made into medical or industrial gloves.

Otten et al. U.S. Pat. No. 6,274,232 discloses an absorbent and cut-resistant sheet having a cut-resistant material with a plurality of openings, and an absorbent material attached to the cut-resistant material. A liquid impervious backing layer is preferably attached to the absorbent material to resist the escape of fluid from the absorbent material.

PCT published application number WO 00/29209 discloses a flexible mat for absorbing liquids on floors or other surfaces. The mat includes a waterproof backing layer and a foam sheet formed by polymerization of a water-in-oil emulsion. The mat can optionally include a liquid pervious sheet and a non-skid material.

SUMMARY OF THE INVENTION

In accordance with one aspect of the present invention, a disposable cutting sheet for cutting and preparation of food items thereon includes a first section having a plurality of apertures therethrough and a cut resistant surface, a second liquid impermeable section disposed adjacent the first section, and a fold line disposed between the first section and the second section, wherein folding along the fold line forms the cutting sheet. The cutting sheet further includes an absorbent material, wherein the first and second sections are folded along the fold line and moved relative to one another to form a pocket therebetween such that the absorbent material is disposed in the pocket between the first and second sections. One of a surface of the first section that faces the absorbent material in a folded position and a surface of the second section that faces the absorbent material in a folded position is roughened or textured in order to prevent slippage of the absorbent material within the sheet when folded.

In accordance with another aspect of the present invention, a disposable cutting sheet for cutting and preparation of food items thereon comprises a sheet having opposite front and back sides, a first section of the sheet including a cut resistant surface surface ply on the front side thereof and having a plurality of apertures therethrough and a second section of the sheet being liquid impermeable. The cutting sheet further includes a fold line between the first and second sections and an absorbent material. The sheet has an unfolded position and a folded position about the fold, wherein the back side of the first section opposes the back side of the second section when the sheet is in a folded position. A surface of the liquid impermeable section that is facing the cut resistant section in the folded position and which is opposite the back side of the liquid impermeable section is roughened or textured to prevent slippage of the absorbent material disposed between the first and second sections in the folded position.

In accordance with yet another aspect of the present invention, a method of manufacturing a single use processing substrate includes the steps of providing a first section of a substrate having a cut resistant surface, providing a second section of the substrate having a liquid-impermeable surface, and creating a fold line separating the first section from the second section.

Other aspects and advantages of the present invention will become apparent upon consideration of the following detailed description and the attached drawings, in which like elements are assigned like reference numerals.

Figure 1B:
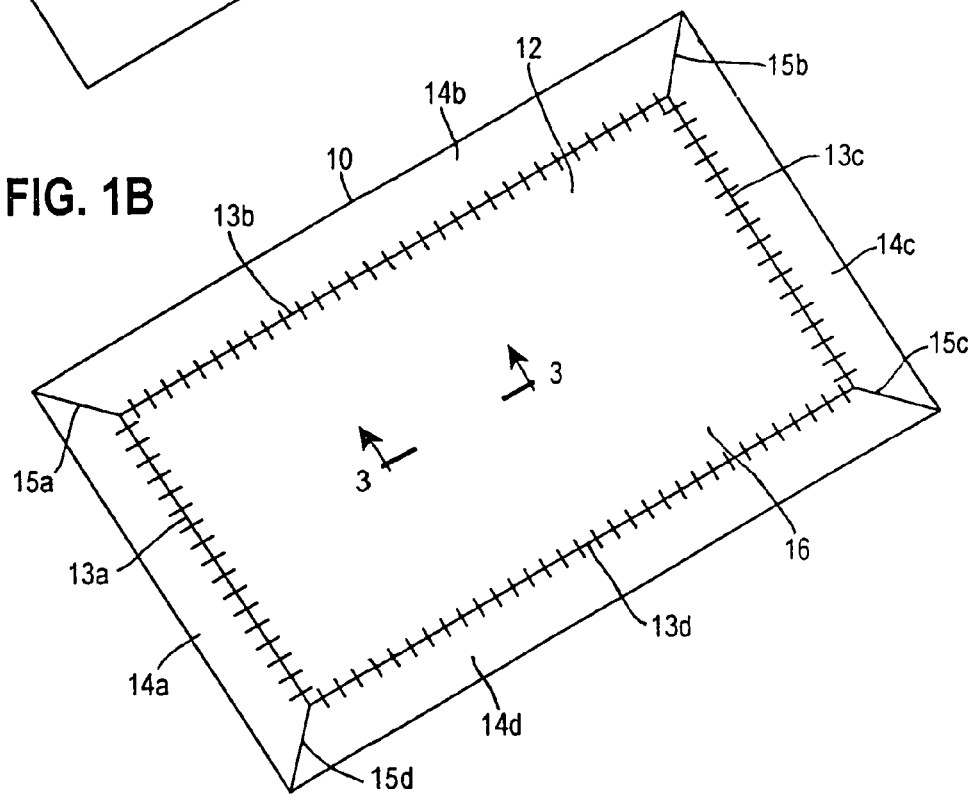
Figure 2:
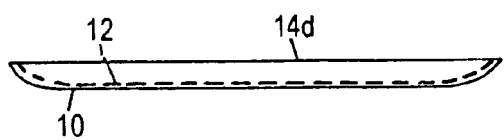
Figure 3:
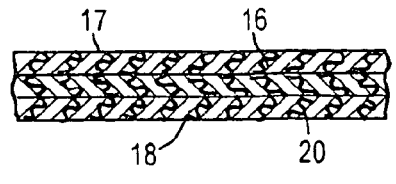
Figure 4:
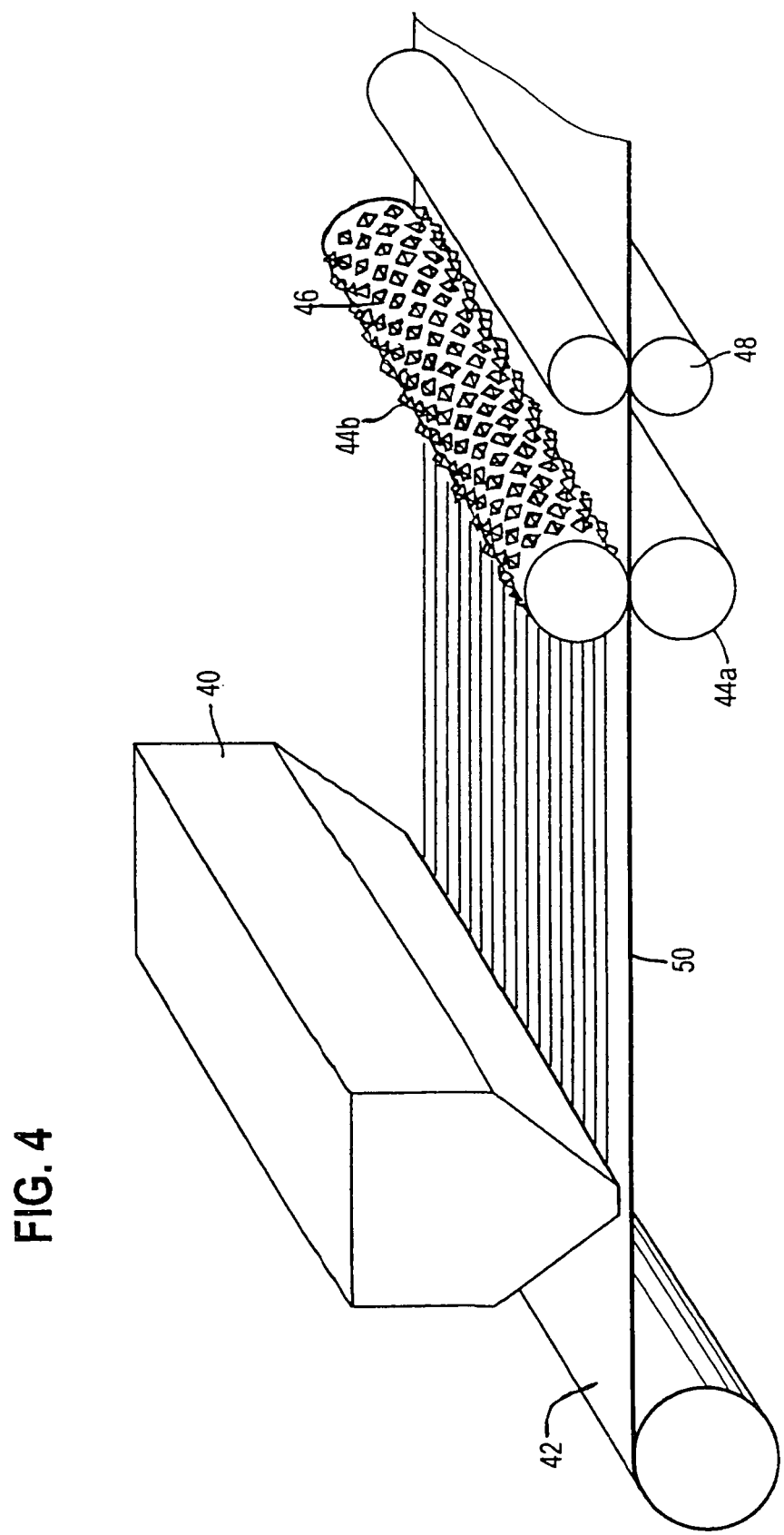
Figure 5:
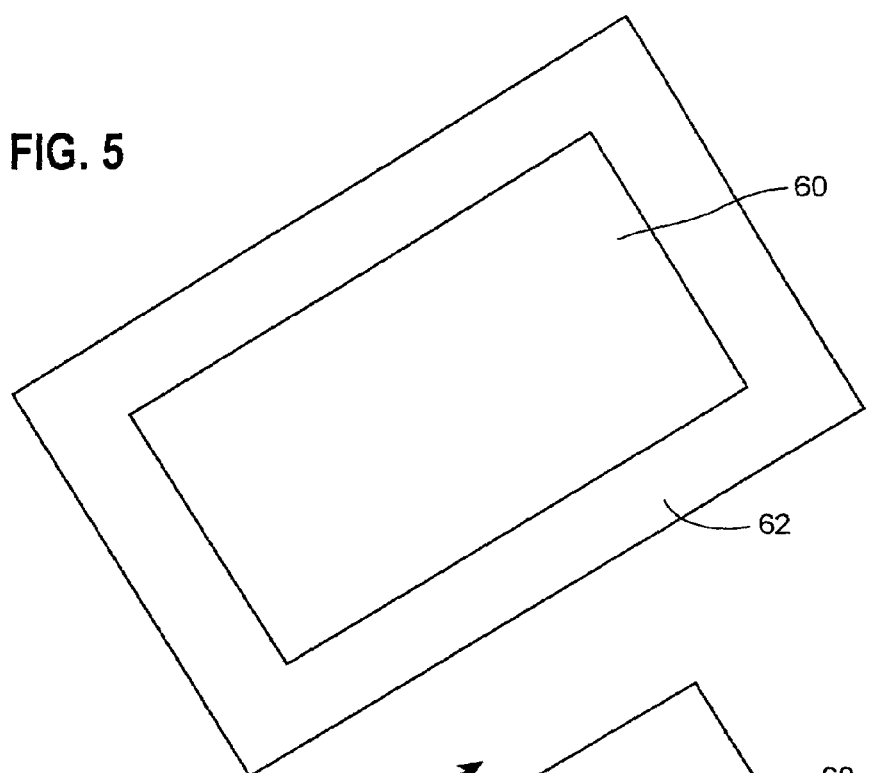
Figure 6:
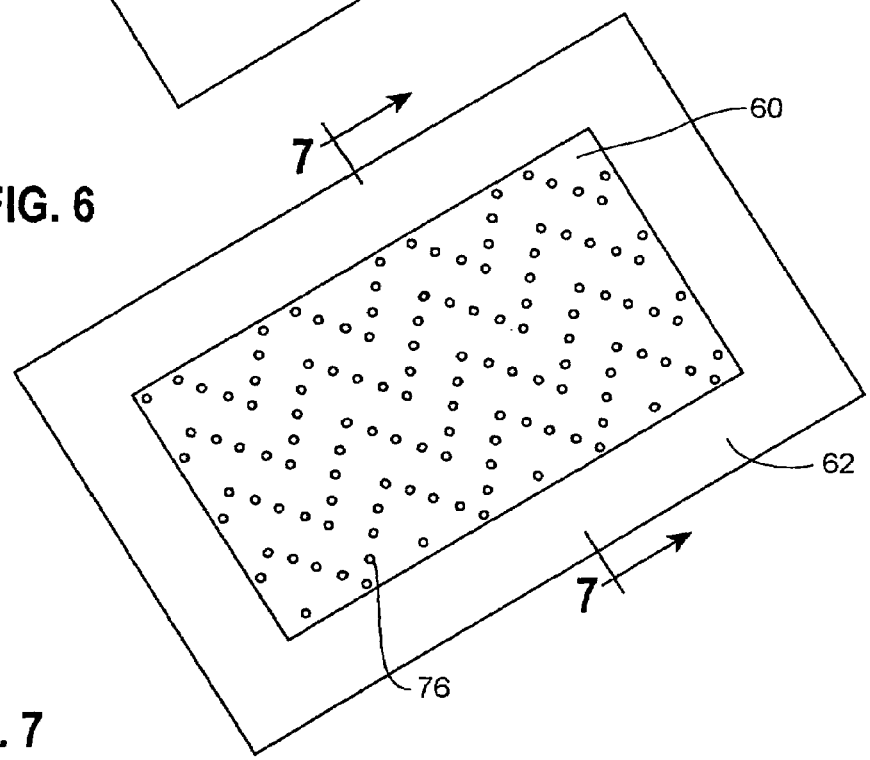
Figure 7:
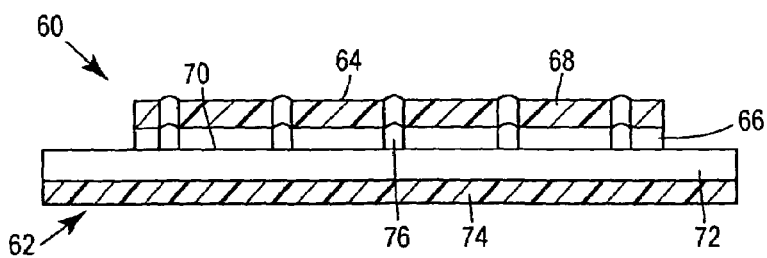
Figure 14:
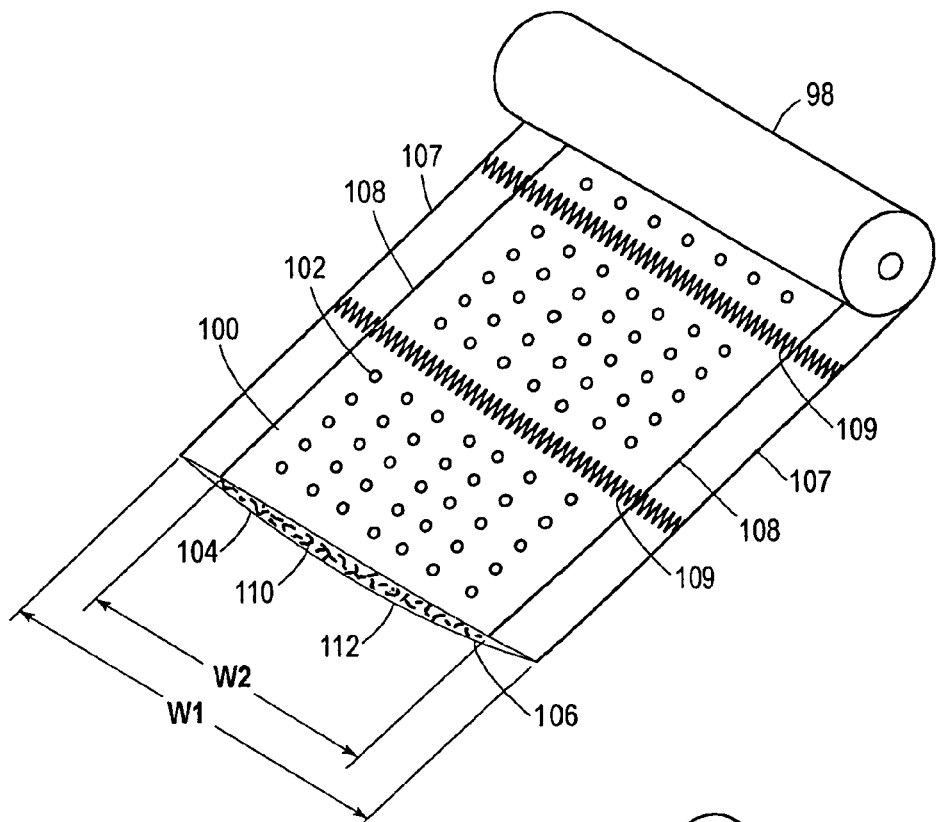
Figure 15:
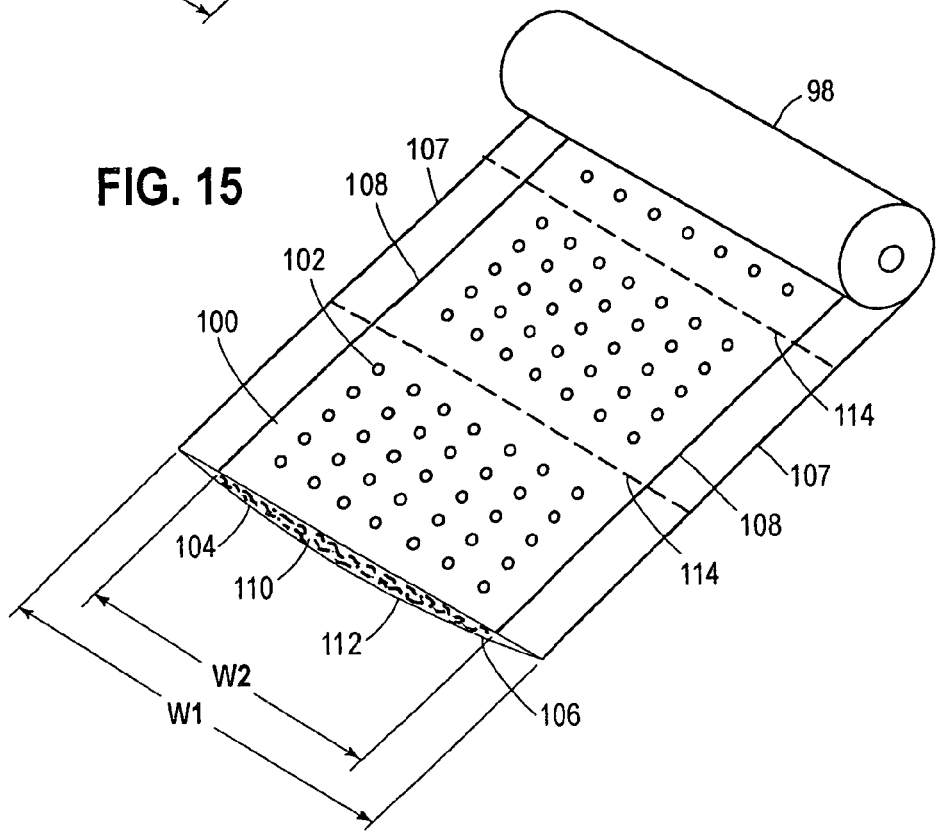
Figure 21:
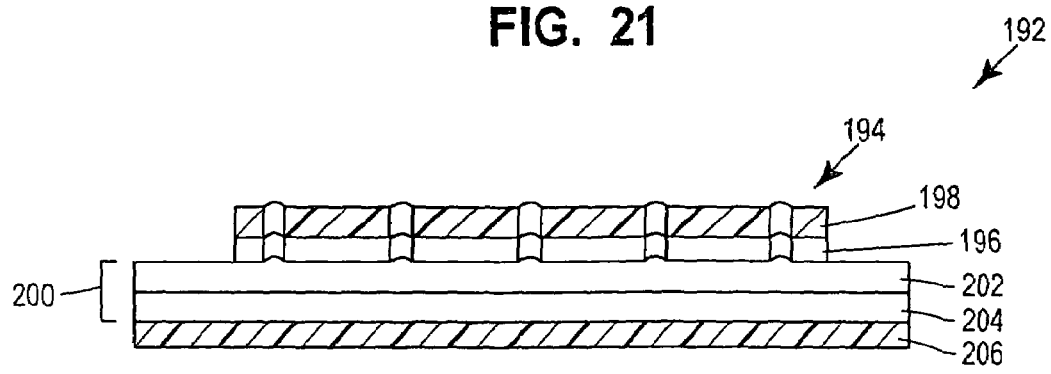
Figure 20:
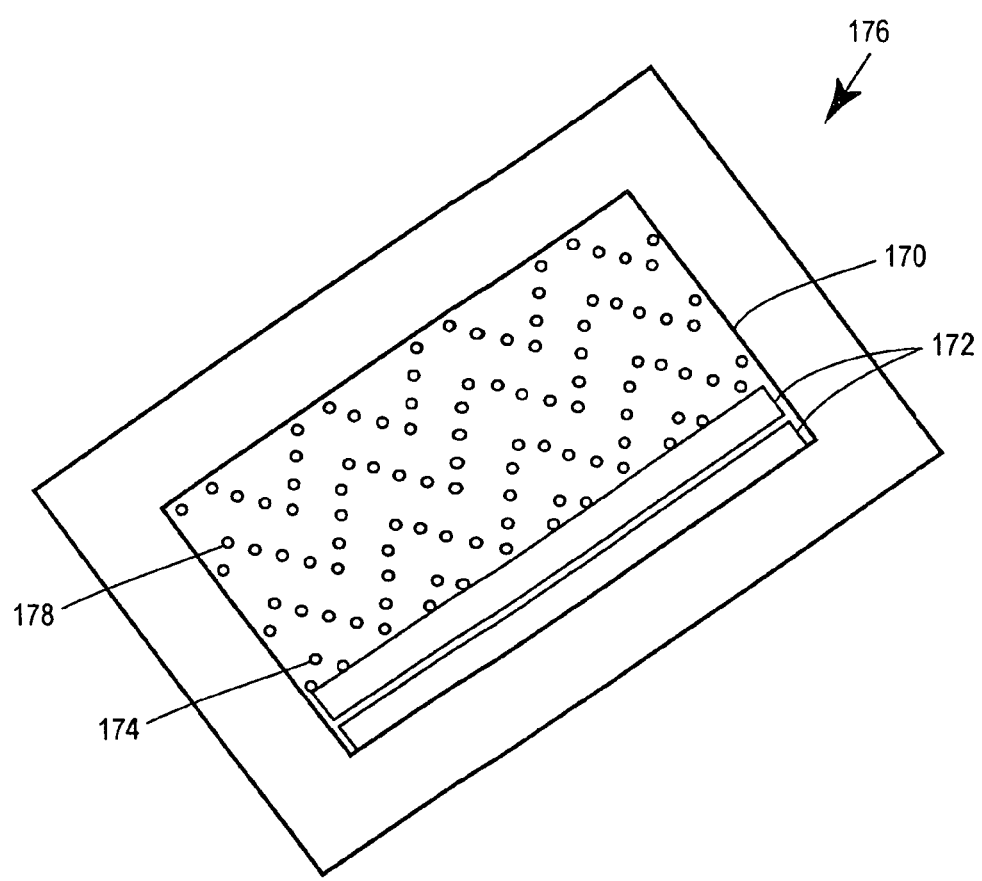
Figure 22:
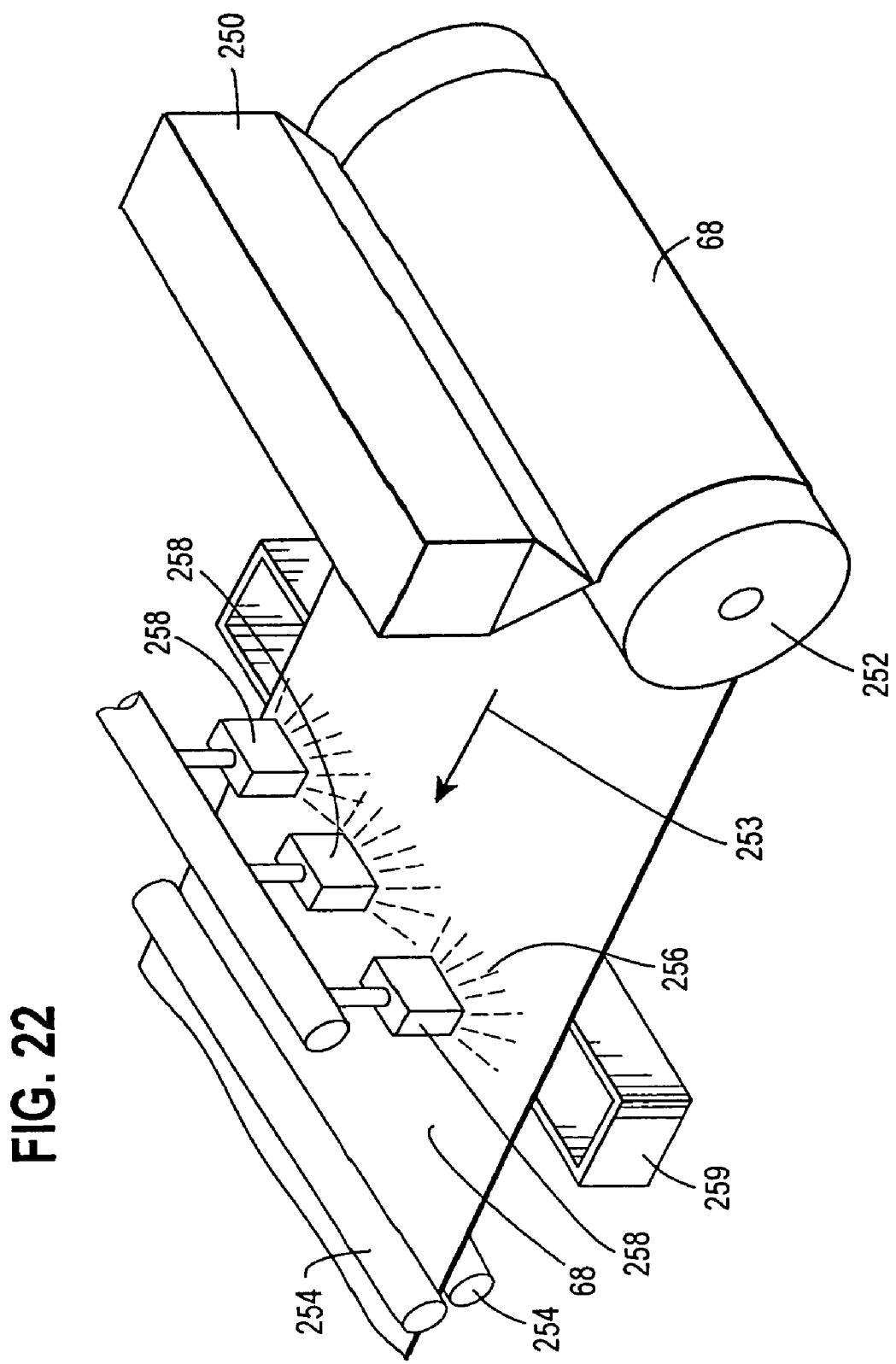
Figure 25:
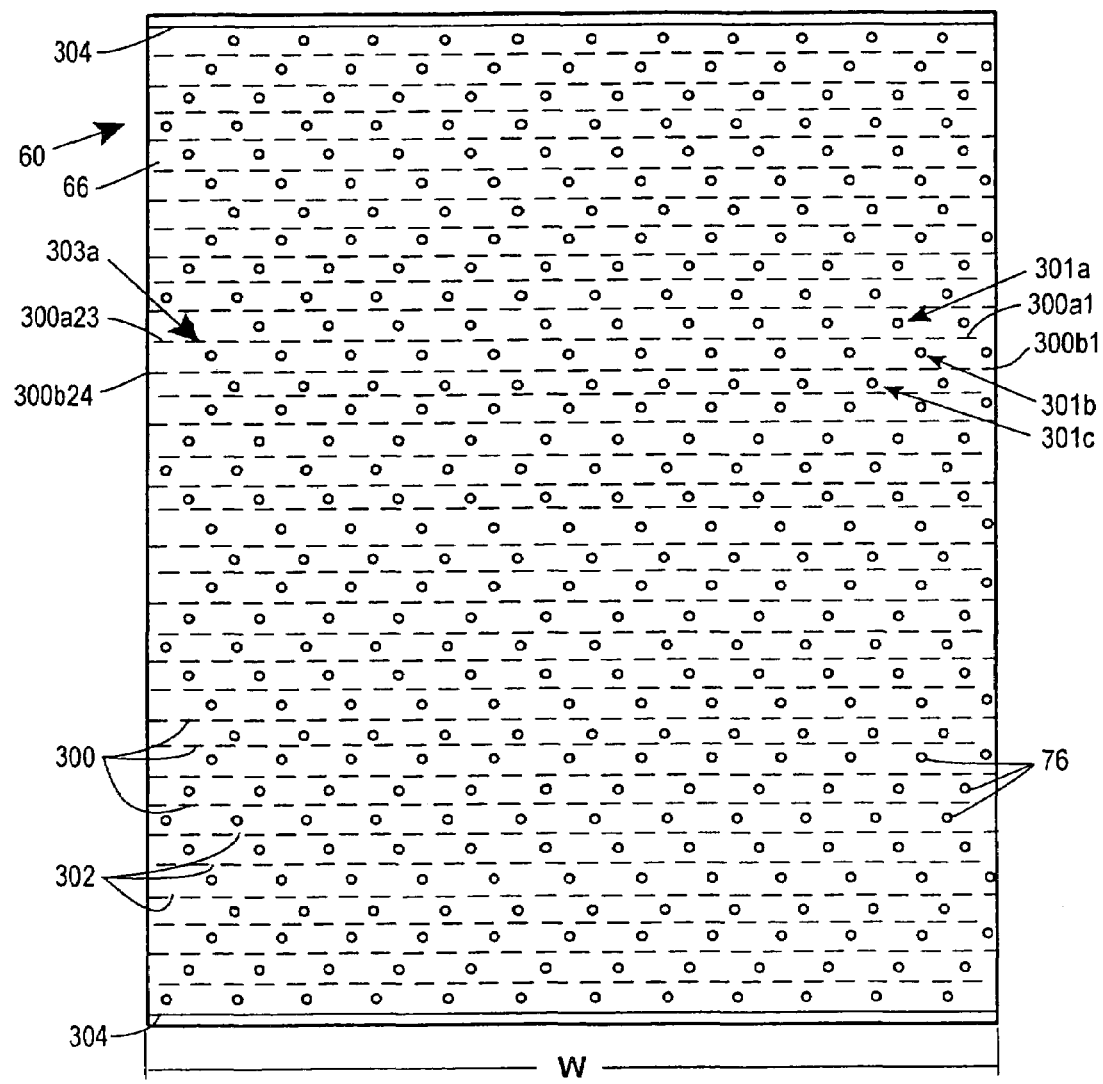
Figure 26:
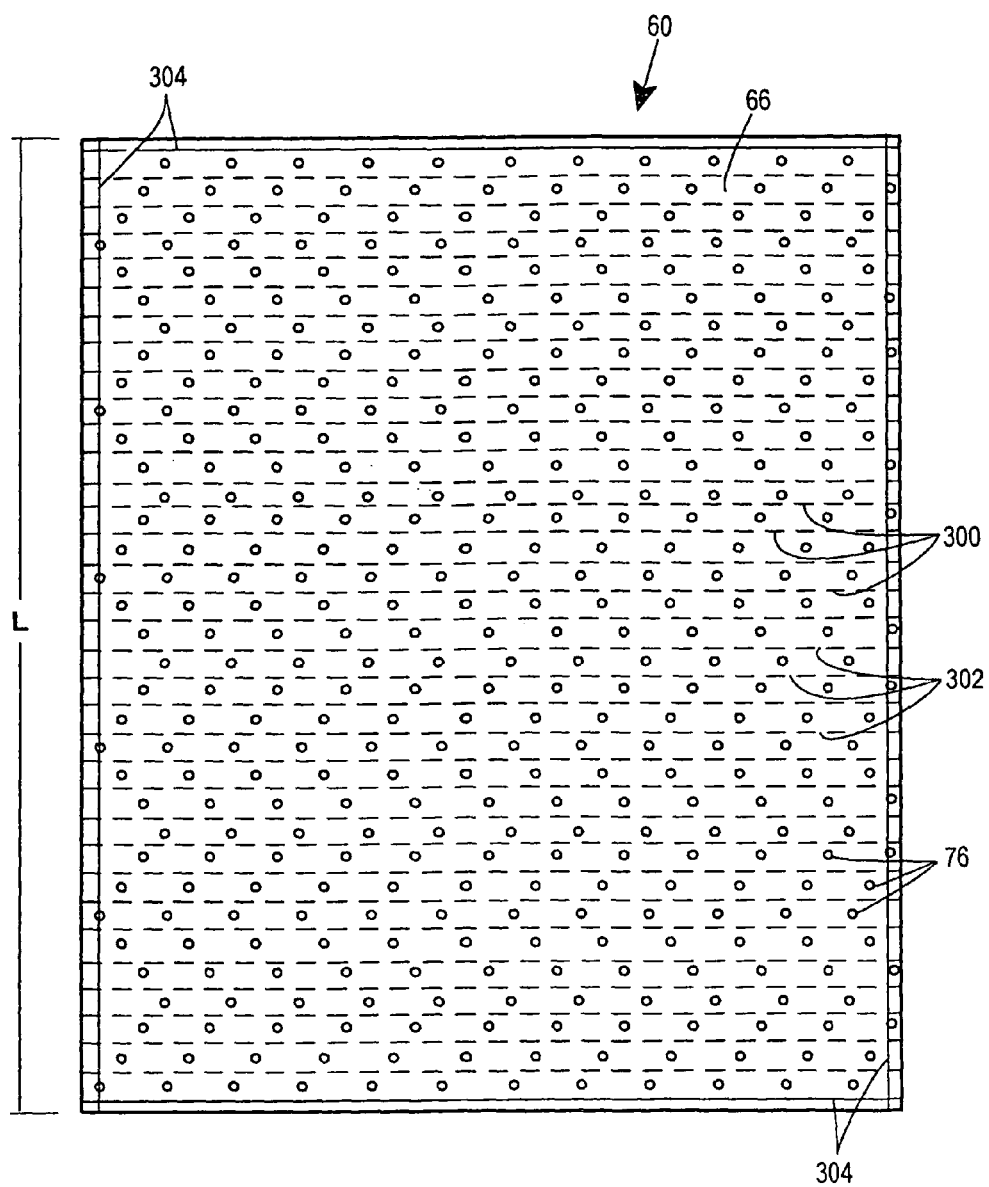
Figure 27:
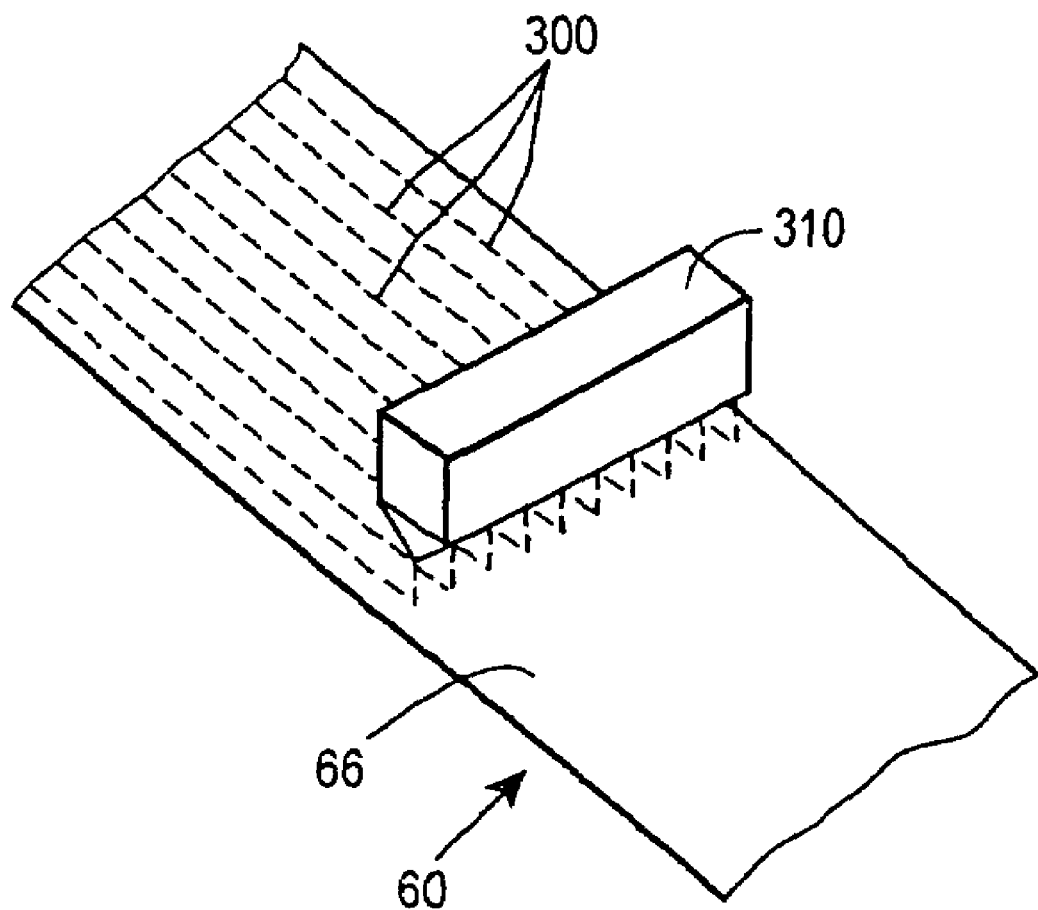
Figure 28:
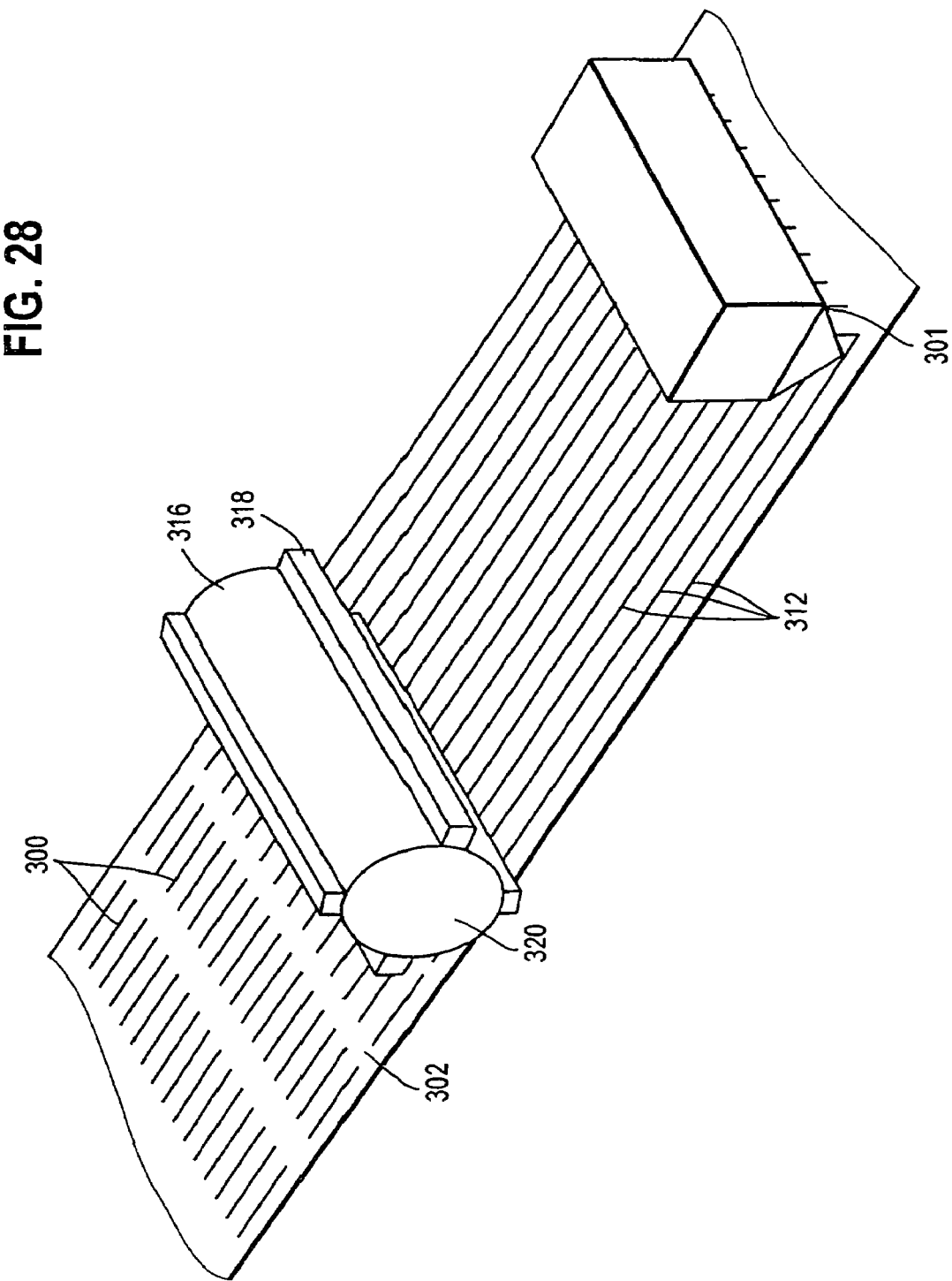
Figure 29:
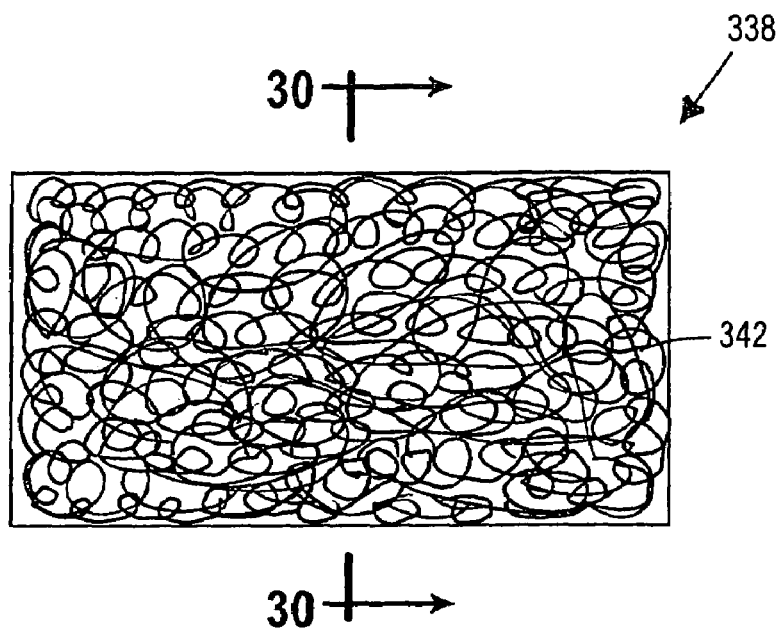
Figure 30:
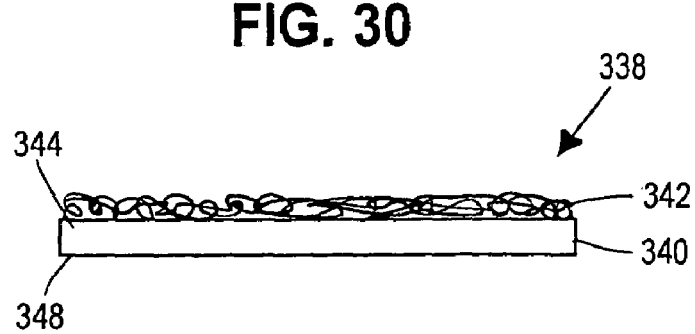
Figure 31:
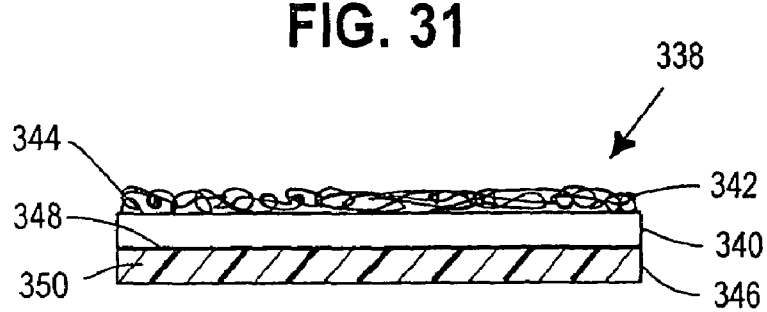
Figure 32:
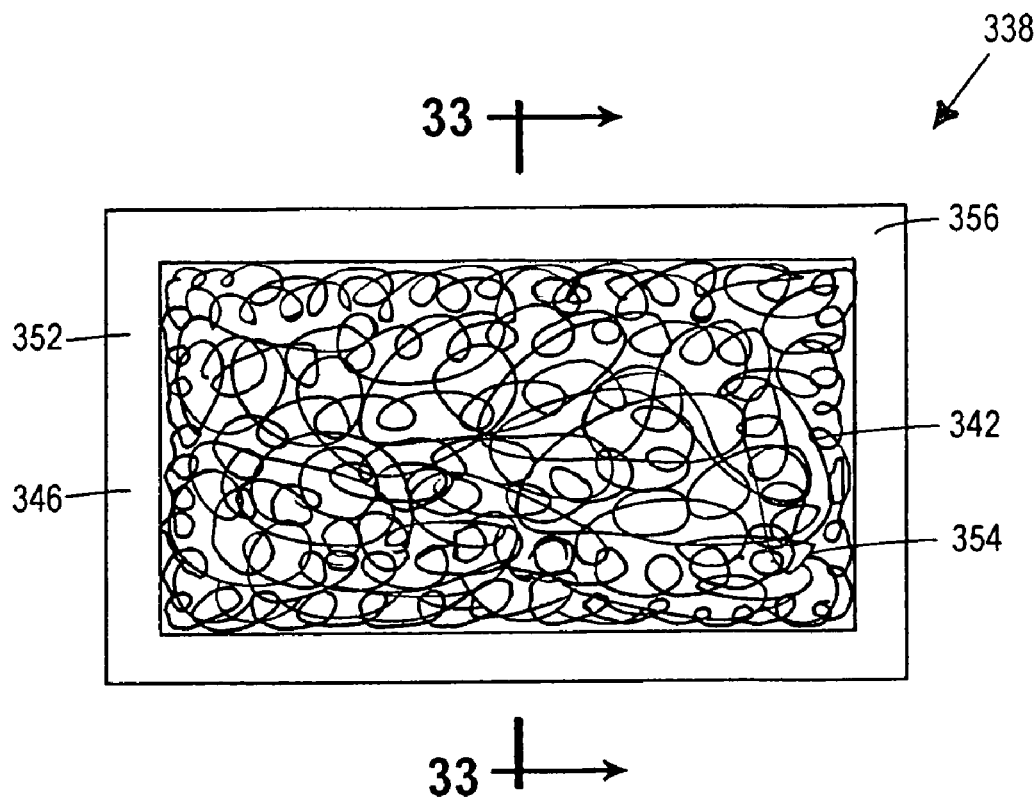
Figure 33:
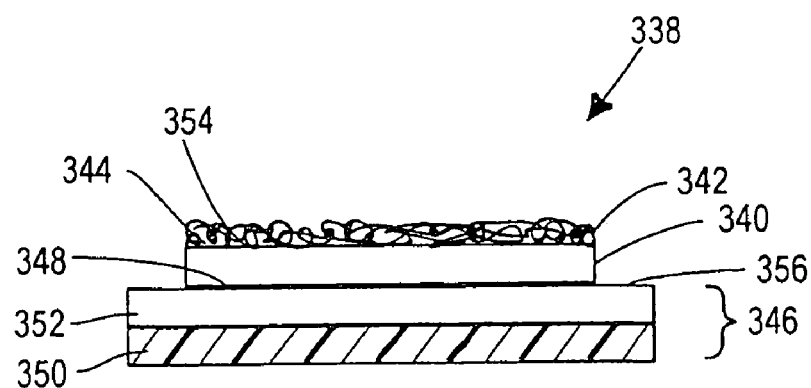
Figure 34:
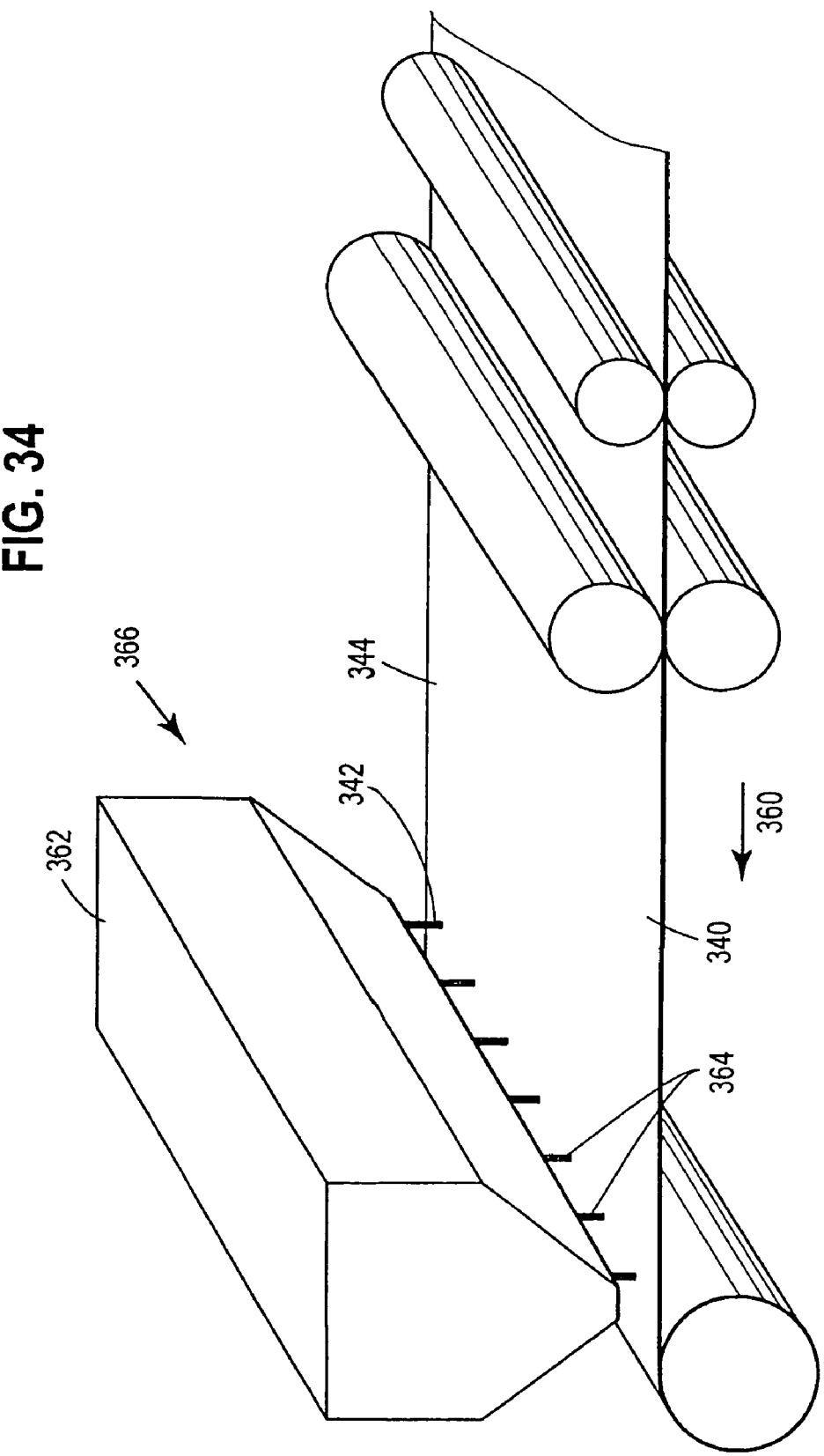
Figure 35:
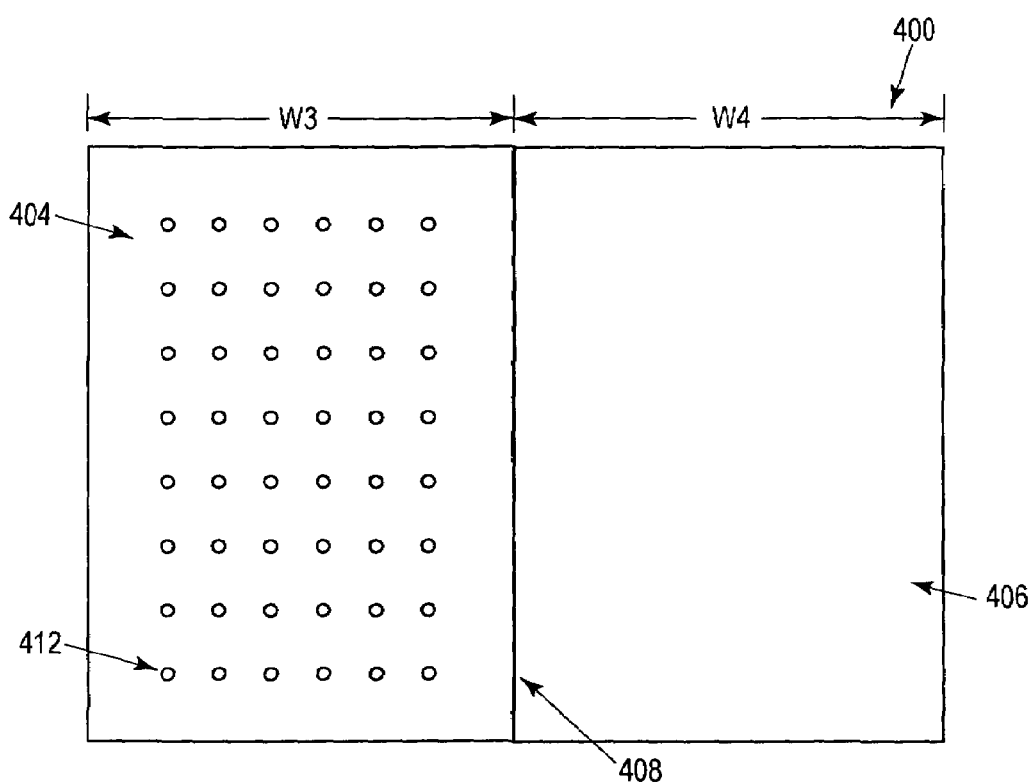
Figure 36:
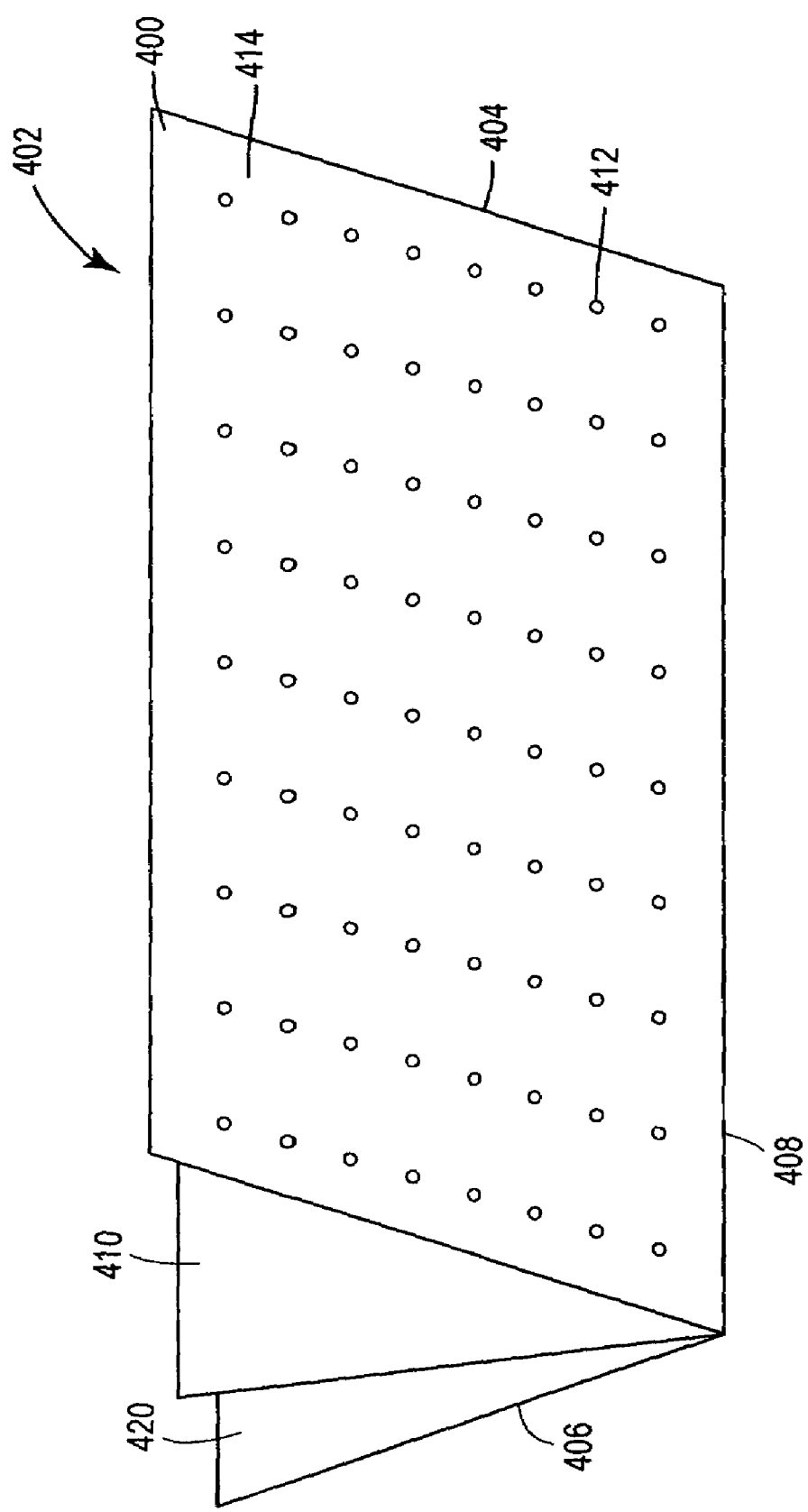
Figure 37:
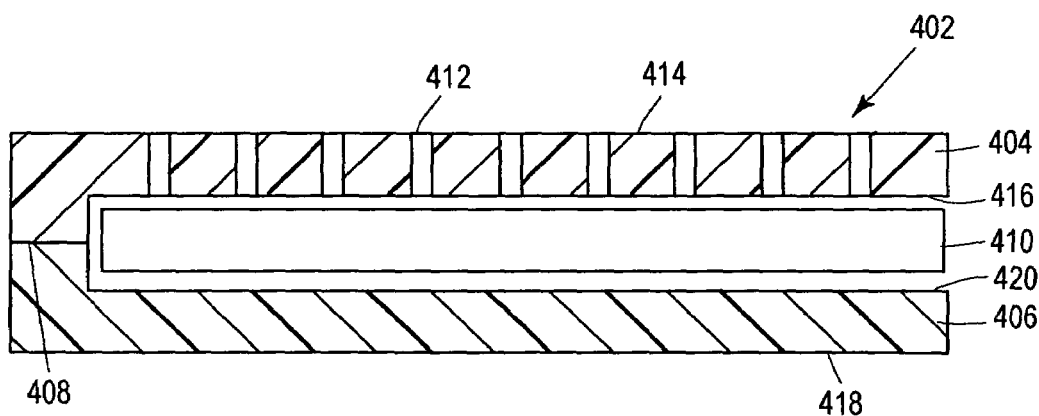
Figure 38:
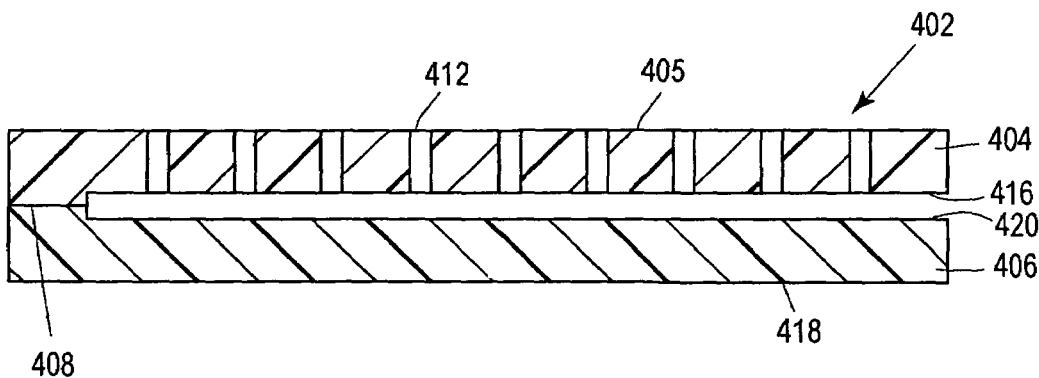

FIG. 1A comprises an isometric view of a processing substrate according to one embodiment;

FIG. 1B comprises an isometric view of a processing substrate according to another embodiment;

FIG. 2 comprises a side elevational view of the processing substrate of FIG. 1;

FIG. 3 comprises a sectional view taken generally along the lines 3-3 of FIG. 1;

FIG. 4 comprises a perspective view of apparatus for producing processing substrates as shown in FIG. 1A;

FIG. 5 comprises an isometric view of a processing substrate according to another embodiment;

FIG. 6 comprises an isometric view of a processing substrate according to another embodiment;

FIG. 7 comprises a cross sectional view of FIG. 6;

FIG. 8 comprises an isometric view of a processing substrate according to another embodiment;

FIG. 9 comprises an isometric rear view of a processing substrate according to FIG. 8;

FIGS. 10–13 comprise plan views of processing substrates according to other embodiments;

FIGS. 14 and 15 comprise isometric views of processing substrates in roll form;

FIGS. 16–19 comprise cross sectional views of processing substrates according to other embodiments;

FIG. 20 comprises an elevational view of a processing substrate according to another embodiment;

FIG. 21 comprises a cross sectional view of a processing substrate according to another embodiment;

FIGS. 22 and 23 comprise isometric views of apparatus for producing processing substrates according to further embodiments;

FIG. 24 comprises a cross sectional view of a processing substrate according to another embodiment;

FIG. 25 comprises a plan view of the absorbent ply of the top layer of a processing substrate according to a further embodiment;

FIG. 26 comprises a plan view of the absorbent ply of the top layer of a processing substrate according to another embodiment;

FIG. 27 comprises an isometric view of an apparatus for producing a processing substrate as shown in FIG. 25;

FIG. 28 comprises an isometric view of another apparatus for producing a processing substrate as shown in FIG. 25;

FIG. 29 comprises a plan view of a processing substrate according to a further embodiment;

FIG. 30 comprises a sectional view of a first embodiment of the processing substrate of FIG. 30 along the lines 30—30;

FIG. 31 comprises a sectional view of a second embodiment of the processing substrate of FIG. 30 along the lines 30—30;

FIG. 32 comprises a plan view of a processing substrate according to another embodiment;

FIG. 33 comprises a sectional view of the processing substrate of FIG. 32 along the lines 33—33;

FIG. 34 comprises a perspective view of an apparatus for producing the processing substrates of FIGS. 29–33;

FIG. 35 comprises a plan view of the processing substrate according to another embodiment;

FIG. 36 comprises an isometric view of the processing substrate of FIG. 25 partially folded;

FIG. 37 comprises a cross-sectional view of the processing substrate of FIG. 25 completely folded in half;

FIG. 38 comprises a cross-sectional view of another embodiment; and

Figure 39:
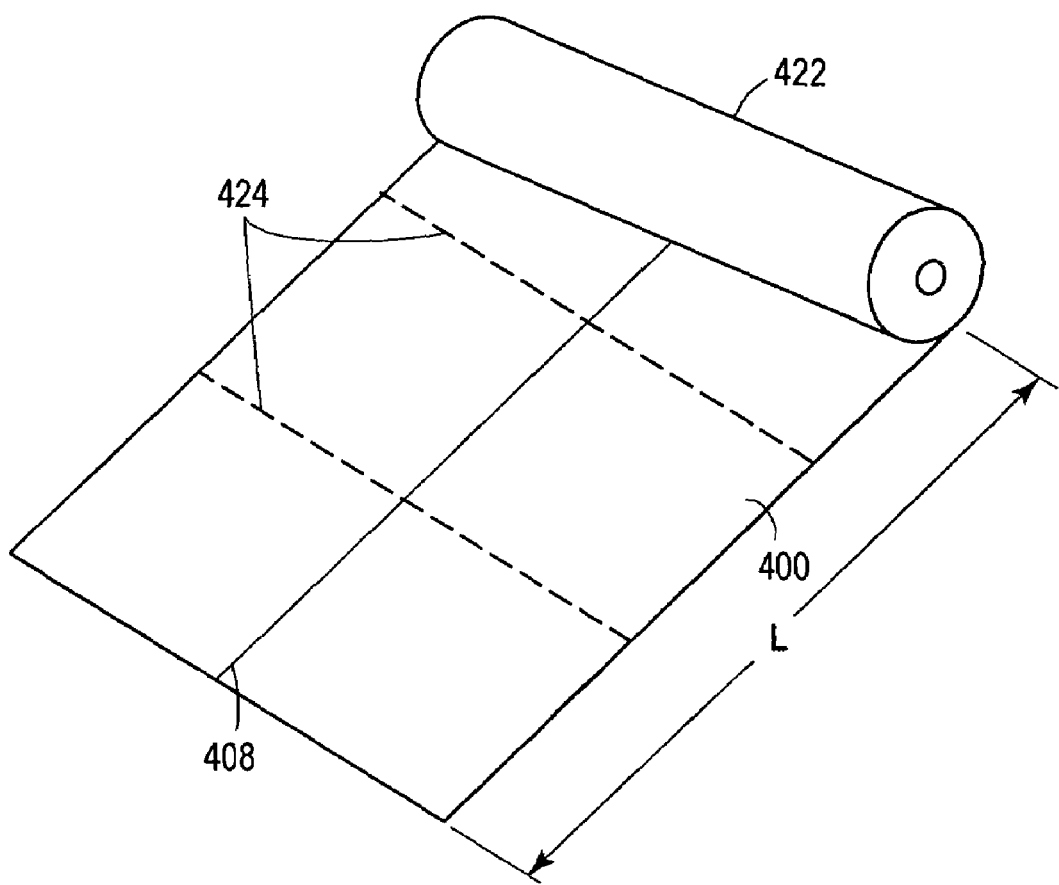

FIG. 39 comprises an isometric view of yet another embodiment.

DESCRIPTION OF THE PREFERRED EMBODIMENTS

Referring now to FIG. 1A, a processing substrate and/or support surface that may be used as a food preparation surface or sheet 10 preferably is planar (i.e., flat) in shape. Alternatively, as seen in FIGS. 1B and 2, the sheet 10 may be tray-shaped and includes a substantially planar central portion or base 12 and inclined or curved side surfaces 14a–14d, wherein the base 12 and side surfaces 14 together define a generally concave structure. The side surfaces 14 may be formed by folding and/or scoring the sheet 10 at corner portions 15a–15d and optionally folding or scoring the sheet 10 at portions 13a–13d intermediate the base 12 and side surfaces 14. The inclined or curved side surfaces 14 could alternatively be formed by any other process, such as forming through the application of heat, vacuum forming, vacuum pressure forming, or the like. If desired, fewer than four inclined side surfaces 14 may be provided. For example, only the inclined side surfaces 14a–14c may be employed to provide a flat edge surface that may be oriented toward the user so that an inclined side surface does not interfere with the user's hands or arms. Preferably, although not necessarily, the sheet 10 is intended for one time use as a cutting surface or as a sheet supporting an article or as a barrier for isolating an article resting on a surface (for example, a plant on a shelf, an article of food on a counter or in a microwave, or the like), or as a food preparation and bacteria management sheet. Following the use the sheet 10 and any waste products and contaminants carried thereby may be disposed of in any suitable fashion. The concave or tray-shaped structure (if used) facilitates retention of the waste products and contaminants during the food preparation, transport and/or disposal processes. Additionally or alternatively, the sheet 10 may be sufficiently flexible to allow the user to bend and/or fold the sheet 10 to prevent escape of waste products and contaminants therefrom during disposal.

Referring also to FIG. 3, according to one embodiment, the sheet 10 also includes a cut-resistant, liquid-permeable top or upper portion or layer 16, which substantially prevents the integrity of the sheet 10 as a whole (and, in particular, the layer 16) from being compromised during cutting while at the same time allowing passage of juices and liquids through the layer 16. Preferably, the upper portion or layer 16 is made of a material sufficiently durable to withstand aggressive cutting of meats, vegetables and other food items by a serrated or non-serrated blade, particularly in the situation where a cutting motion is applied to meats, poultry or fish (or any other fibrous protein material) that results in the application of cutting force components in multiple directions to the item. A serrated blade presents a series of equally or non-equally spaced points or tips to the upper surface of the layer 16 that can snag or otherwise catch on edges of the material used for the top layer 16. Because of this it is generally preferred (although not necessarily the case) that the top layer 16 have irregularly or randomly spaced openings therein that prevent any points or tips from contacting material below the layer 16 during cutting. In this way, the possibility that the integrity of the sheet 10 would be compromised is reduced.

In addition to the foregoing, the upper portion or layer 16 preferably has an upper surface 17 that is textured or otherwise formed to prevent slippage of items thereon during processing.

The sheet 10 further includes a middle or intermediate portion or layer 18 that may be made of a liquid absorbent material that retains the juices and liquids passed by the upper layer 16, as well as a bottom portion or layer 20, which is preferably made of a slip-resistant, liquid, and bacteria impervious material to prevent slipping of the sheet 10 and leakage of liquids and transfer of bacteria onto or from a work surface (such as a countertop, a cutting board, or the like) during use.

The upper layer 16 may be of a length and width substantially equal to the length and width of the middle layer 18. Alternatively, the upper layer may be of a smaller size than the size of the layer 18, thereby providing a cutting surface that is partially or fully surrounded by portions of the middle layer 18. As a further alternative, the top and bottom layers 16, 20 may be of the same size and the middle layer may be of a smaller size and so arranged relative to the layers 16 and 20 such that the middle layer 18 is surrounded by the joined outer margins of the layers 16 and 20.

If desired, the sheet 10 may instead include a different number of layers or portions each imparting one or more desired characteristic(s) to the sheet 10. In addition, the sheet 10 may comprise a single layer or portion or multiple layers or portions wherein each layer or portion is made of material that is differentially treated during production to obtain multiple desired characteristics. Still further, the sheet 10 may include one or more layers or portions that are not differentially treated during production in combination with one or more layers that are differentially treated during production. For example, the sheet 10 could comprise a single layer that is liquid absorbent, but which has a first surface that is treated (by any suitable process, such as the application of heat or a chemical additive) during production to produce a cut-resistant, liquid-permeable surface. The sheet 10 may further have a second surface opposite the first surface that may be treated by any suitable process (for example, as noted above) during production to produce a slip-resistant barrier surface. Alternatively, the sheet 10 could comprise two layers, a first of which provides a slip-resistant barrier surface, and a second of which provides a cut-resistant surface. In this case, the liquid absorbent layer may be omitted, or the liquid-absorbent material may be provided as part of one of the first or second layers or as a separate layer. Still further, the slip-resistant surface and/or the cut-resistant, liquid-permeable surface could be omitted, if desired.

The various layers 16, 18 and 20 are secured or formed together in any suitable fashion taking the various materials of the layers into account. For example, two or more of the layers 16, 18, and 20 may be heated to fuse the layers together or the layers may be laminated as part of an extrusion process. Two or more of the layers could instead be secured together by an adhesive including a hot melt adhesive as well as a solvent or water based adhesive, as long as the adhesive is approved for food contact and compatible with the layers. Alternatively, two or more of the layers 16, 18, and 20 may be formed using materials and/or a manufacturing process which result in simultaneous formation and bonding of such layers. Still further, the layer 16 may be bonded or otherwise secured to the layer 20 at selected locations, thereby capturing the layer 18 therebetween. In this case, the layer 18 may have one or more voids therein to facilitate the joinder of the layers 16 and 20 at the location(s) of the void(s). Still further, the layer 18 may be omitted and the layers 16 and 20 may be joined at spaced locations to create voids between the layers 16, 20 which serve to attract and retain liquid(s) therein by capillary action.

FIG. 4 illustrates an apparatus that may be used to produce a number of cutting surfaces as shown in FIG. 1A. An extrusion die or other delivery device 40 deposits thin streams of molten thermoplastic onto a web 42 of liquid-absorbent material, such as cellulosic tissue or batting. The material deposited on the web 42 is chosen from but not limited to polyolefins, such as polyethylene (PE), polyolefin metallocenes, metallocene polypropylene (mPP) or polypropylene (PP) including homopolymers and copolymers thereof, polyester, such as polyethylene terephthalate (PET), polystyrene (PS), polyvinyl alcohol (PVA), polyvinyl chloride (PVC), nylon (such as nylon 6 or nylon 66), polyacrylonitrile (PAN), acrylonirile-butadiene-styrene (ABS), ethylene-vinyl acetate (EVA) copolymer, multi layers of the same or different polymers, blends and recycled polymers (including polymers that are cured by ultraviolet or visible light, an electron beam, water or other curing agent). Addition of one or more filler(s) may be advantageous both from a cost advantage as well as improvement of modulus, heat distortion and cut resistance. Preferably, each stream is approximately on the order of 1–100 thousandths inch (0.0254 mm–2.54 mm) wide and are deposited at equally-spaced locations on the web 42 approximately 1–500 (0.025 mm–12.7 mm) thousandths inch apart. Alternatively, the streams may be deposited at non-equally spaced locations on the web 42 and/or may be of differing widths and/or may be deposited at different points of time. Still further, different stream shapes (e.g., a wavy, curved, discontinuous or interrupted stream as opposed to the linear continuous stream extent described above and/or a different cross-sectional shape) and/or different materials could be sequentially deposited on the web 42. In other words, a single stream may comprise a first portion of a first material, a second portion deposited after the first portion of a second material, a third portion deposited after the second portion of a third material or the first material, etc. In an alternative embodiment, adjacent streams may be of differing materials. In a general sense, N different materials may be deposited or otherwise formed in situ on the web 42 in a repeating or non-repeating sequence or pattern or in a random fashion. In the case of a repeating sequence or pattern, the repetition frequency may be established at a value less than or equal to N. In any event, the choice of materials, sequence or pattern, and the like affect the physical characteristics of the resulting surface.

If the upper layer 16 is to be smaller than the size of the layer 18, then the streams are deposited only on a center portion of the web 42. In addition, the flow of thermoplastic resin is periodically interrupted so that discrete portions of web are formed having thermoplastic thereon wherein such portions are separated by further web portions not having thermoplastic deposited thereon. The web 42 then passes between a pair of rolls 44a, 44b. Preferably, the roll 44a is smooth and the roll 44b has a plurality of diamond-shaped or other shaped protrusions 46 on the surface thereof. The protrusions 46 deform and spread out the still molten thermoplastic streams to transform the linear streams into a desired two or three dimensional pattern of thermoplastic resin on the web 42. The web 42 then passes between one or more additional pairs of rolls 48 that further spread out and/or flatten the thermoplastic streams and impart a desired texture thereto. The resulting surface provides cut resistance and prevents food from sliding thereon If desired, any pattern can be created on the web 42, for example, a random pattern or a crisscross pattern could be created by drizzling, spraying or otherwise applying the material thereto.

Thereafter, the web 42 is inverted (i.e., turned over) and the layer 20 is formed in situ by lamination or other delivery of a thermoplastic or other material onto an undersurface 50 by an extrusion die or other delivery apparatus. The layer 20 may alternatively be formed without first inverting the web 42 by any suitable process. The layer 20 may be formed of any of the materials described above in connection with the layer 16 including polyolefins such as PE or PP, polyesters such as PET, PS, PVA, PVC, nylon, PAN, ABS, EVA, etc. In alternative embodiments, a suitable coating material may be applied by a sprayer and mechanically processed by a doctor blade or a portion of the material of the layer 18 may be melted or otherwise differentially processed as noted above so that a sealed portion is obtained (if the material of the layer 18 so permits). Still further, a barrier layer of TYVEK® (sold by E. I. Du Pont de Nemours and Company of Wilmington, Del.) may alternatively be secured to the underside of the web 42 by any suitable means.

The layer 20 may be formed with a pattern or texture by embossing and/or may be coated or laminated or otherwise formed with a slip-controlling (such as slip resistant) or adhesive material. The slip control may be provided by a continuous or discontinuous surface of the layer 20, as desired. The resulting coated web is then cut at appropriate locations to form the cutting sheets.

The processing substrate as described herein is not limited to the concept of utilizing disposable, absorbent barrier surfaces in place of conventional cutting boards, but encompasses all food handling and article support occasions where absorbent, liquid/bacteria barrier management is desirable. The processing substrate can have arrangements of various barriers, absorbent and cut/physical abuse resistant mechanisms for the management by containment or isolation of wastes and bacteria encountered during food processing, such as cutting, draining and accumulating (staging). All of these processes involve the use of a generally horizontal work surface, where the embodiments herein may be advantageously employed. In general, of the processing substrate may include N layers or other portions which may be arranged in a suitable or desired fashion to obtain the desired mechanical, absorbent, barrier, and/or other characteristics.

A preferred embodiment utilizes the cut resistant layer 16 as the top layer, where the cutting operation is performed. If desired, the layer 16 may be omitted and the cut-resistant surface could instead be provided as part of the bottom layer 20. In this case the cut-resistant surface would need to be impervious to liquid and the material of the middle layer 18 could be exposed directly to the item being cut. This alternative may result in the possibility of material transfer from the layer 18 to the food, although such possibility can be minimized through careful control of materials and design. For example, in an embodiment where the liquid absorbent layer 18 is the top layer, effort should be made to ensure minimum transfer of material (e.g., fibers) to the food being cut. In the case of paper, woven or nonwoven fabrics as the material of the liquid absorbent layer 18, thermal bonding of fiber to fiber in such layer and/or fiber of such layer to the material of the bottom layer 20 significantly reduces fiber transfer to the food. Many other commercially available techniques for minimizing transfer of material(s) exist. For example, various thermal embossing patterns could be used. Care should be taken to ensure that the absorptive capacity of the material of the layer 18 is minimally affected by the mode of bonding.

Other arrangements can be envisioned, such as thermoplastic/cellulosic conglomerates or agglomerates. In these arrangements thermoplastic and cellulosic absorptive materials are compressed together or otherwise processed and/or combined to form a cut resistant, absorptive sheet. When a thermoplastic liquid barrier component is fused on one side, a cut resistant, absorptive, barrier system is formed.

Still further, each layer or portion may be "tuned" (in other words, the material selection, properties and/or amounts may be controlled) to obtain the desired attributes and properties for each. For example, a first sheet could be designed for cutting chicken comprising an upper layer of PE or PP, a middle layer of cellulosic absorbent material and a barrier layer of polymeric material as described above in connection with FIG. 4. A second sheet could alternatively be envisioned for light food preparation (such as assembling sandwiches from pre-cut foods) including the same three layers in different proportions. This might comprise an upper layer of PE or PP having a thickness substantially less than the thickness of the upper layer of the first sheet, a middle layer of cellulosic absorbent material identical to the material of the middle layer of the first sheet and a barrier layer of polymeric material identical to the material of the barrier layer of the first sheet. The thicknesses of the middle and barrier layers of the second sheet may be different than or identical to the thicknesses of the same layers of the first sheet. This provides a sheet having lesser cut resistance than the first sheet, but still provides a sheet having the desired absorbency and barrier characteristics appropriate to the intended application for the sheet. Still further, the cellulosic material of the middle layer might be replaced by a more oleophilic material, such as nonwoven polypropylene or the same or a different cellulosic material that has been treated to increase the oleophilic properties thereof, to form a sheet for managing oil during food preparation.

Any of the embodiments disclosed herein provide a processing and/or support surface that retains liquids yet is convenient and space effective for easy disposal. The product may be pre-treated for packaging purposes and/or to allow easy and convenient disposal. Examples of pretreatment for easy disposal include pleating, folding, scoring, forming and the like.

As noted above, the cut resistant top layer 16 may be made from a random or regular pattern of thermally formable material or coating materials. In addition to the examples given above, the material of the layer 16 may comprise latexes, epoxies, paper coating and a contact drum print that is treated by a doctor blade. Still further, a continuous sheet of polymer film could alternatively be used in place of the cut-resistant upper layer described in conjunction with FIG. 4, wherein the film is perforated by any suitable process, such as vacuum, needle or water jet perforating, laser, hot pins or mechanical punching to create holes for the passage of liquid therethrough. A minimum hole diameter of between about 0.060 and about 0.125 thousandths inch (0.003175 mm–0.001524 mm) is preferred. Less than 8 holes/square inch (depending upon hole size(s)) is preferred. The spacing between the tips of serrated knife blades vary; however, the smaller the hole diameter, the less the chance that a tip of such a blade will catch on an edge of a hole. The film can be made of virgin polymer or blends of virgin and recycled materials or from recycled materials alone. As noted above, fillers or pigments to increase opacity, optimize desired properties, and/or reduce cost are options. Alternatively, porosity can be achieved using different processes such as pre- or post-lamination, lost mass process, leaching or scavenging.

The cut resistant layer 16 can alternatively comprise other cut resistant structures, such as netting, fabrics or scrims, so long as the layer allows easy passage of juices and other liquids through to the absorbent layer 18. In each embodiment, the minimum thickness for the layer 16 is approximately 5 mils (0.127 mm) for unfilled materials, but it may be possible to achieve adequate cut resistance with thinner arrangements.

Care should be taken to use food contact approved materials. The use of a discontinuous layer affords a cut resistant barrier that keeps the material of the layer 18 from the surface of the item being cut. Also, the discontinuous layer lends itself to being easily disposed of due to ease of "wadding" by the user The liquid-absorbent layer 18 preferably is an absorbent structure selected from, but not limited to: non-woven fabrics of synthetic polymers or blends of fibers; laminates of various fabrics or combination of fabrics; cellulosic material(s), meltblown and spunbonded nonwoven fabrics, woven fabrics, multiple layers and combinations of fabrics and papers, absorbent powders like polyacrylic acid polymers, open-celled foams, perforated closed cell foams and/or blends of polymer and cellulosic materials. The layer 18 could alternatively comprise any other suitably absorbent commercially available materials.

If a synthetic polymer fabric, woven or nonwoven, is used for the layer 18, a food-contact approved wetting agent or other surface additive may be required to ensure water wettability of the fabric. Typical levels are <1% by weight of the fabric. Some hydrophilic fibers can be used for layer 18 in blends with synthetic polymers to eliminate the need for surfactants. Examples of these hydrophilic fibers are cellulose, rayon and PVA; however, the applications herein are not limited to these hydrophilic fibers. In some cases, lamination of two different fabrics may be necessary to obtain sufficient hydrophilic properties. However, it is preferred in this example, to use a blend of fibers in one fabric. Typically, a minimum of 5 to 10% hydrophilic fiber is needed in a fiber blend to ensure that the fabric has sufficient hydrophilic properties. An additional benefit of using fiber blends in the layer 18 is the possibility to use different polymers in the layer 16 and still employ thermal bonding of the layers.

The bottom layer 20 forms a barrier to prevent liquids from the absorbent layer 18 from passing through to the surface of the counter top or other support surface. The bottom layer 20 also blocks the transfer of bacteria between the layers 16 and 18 and the surface supporting the sheet 10.

The bottom layer 20 can be any substrate material that prevents passage of liquid therethrough. For example, the layer 20 may comprise a continuous sheet of PP or PE film (or any other polymer film, such as those noted above) having a thickness on the order of 0.25–5.0 mils (0.00635–0.127 mm), although a different thickness could be used instead. Fillers and/or coloring agents or other additives can be utilized to obtain the desired characteristics, color and/or opacity. Like the layer 16, the film can be made of virgin polymer or blends of virgin and recycled materials or from recycled materials alone. Typically, the layer 20 is fabricated of materials chosen from a group of materials that will thermally bond to the layer adjacent thereto (in the preferred embodiment the layer 18), thereby obviating the need for adhesives, which are costly and can adversely affect the desired characteristic (e.g., the absorbent nature) of the adjacent layer.

In summary, the embodiments discussed herein comprehend any structure (single layer or multilayer, conglomerates, agglomerates, foams, product suspended in one or more matrices or suspensions) having cut resistant properties, liquid-absorbent properties and/or barrier properties. The properties may be afforded by any suitable processing technique(s), such as coating or other application of product, denaturing or other change in a material (whether by flame treating or other application of heat, chemicals, irradiation, UV, IR or visible light, etc . . . ), mechanical or electrical processing, or the like. In addition, the various materials may be selected from ecologically advantageous materials that biodegrade.

In the case of foams, these can be either of the open-cell or closed cell type made from conventional polyolefins or polyolefin filled materials. Still further, a foam can be filled with combinations of any of the non-conventional materials listed below, such as egg whites and shells or other foams could be used with fillers like mica, starch, wood flour, calcium carbonate, and flax. Other suitable materials may be bread impregnated with adhesive binders, foamed potato starch or polyvinyl acetate with any number of fillers like ground bone, lime or talc. Other suitable foams are polyvinylpyrollidone aggregate open cell foams and PE and PP aggregate foams. Such combined materials can provide cut resistance and/or liquid absorption properties.

Hollow fibers could also be employed. In this case, hollow fibers of a critical diameter may be used to suck up and retain water by capillary action. These fibers could possess cut resistant properties as well as liquid management properties and a barrier layer could be secured by any suitable means to a mat of such fibers to obtain a processing surface.

The following materials possess one or more of the above absorptive properties, cut resistance properties, and barrier properties effective to manage bacteria or liquids during the preparation of food. Accordingly, any of these materials can be used in the embodiments herein. Some are very eco-effective in that they decompose directly to food for biocycles and many do not absorb microwave energy and are safe for use as a support surface in microwave ovens:

"Earth shell "(a composition of potato starch and lime manufactured and/or sold by E. Khashoggi Industries, LLC of Santa Barbara, Calif.);

clay or clay-filled materials optionally reinforced with materials such as ground corncobs, silica, irradiated waste sludge or woven straw;

kelp and other marine vegetation;

ground marine shells (e.g., lobster, crab, shrimp or any other exoskeletal creatures, oyster, clam, scallop or zebra mussel shells) held together by a binder or matrix of any suitable material, such as barnacle adhesive;

cork;

wood or wood product derivatives and veneers;

natural fibers like cotton or wool either woven or in non woven batts;

materials such as flour, silica, rice, rice kernel, rice germ or starch of any kind (e.g., corn or potato starch) either alone or held together by a binder such as polyvinyl acetate or held together as conglomerate or agglomerate systems by any appropriate material(s);

animal, insect and/or fish products including shells, skins, hides, hooves, glues made from hides or hooves, scales or bones;

other protein glues or glues from other products (such as gluten);

egg white or egg yolk composites with flour, rice, egg shells, flours with yeast, corn starch or potato starch;

lecithin;

polymeric substances created from high temperature treatment, or other breakdown, of carbon chains predominantly in sugars and oils, such as is found in apples, grapes, cherries or other fruit (skins and/or pulp), olives (skins and/or pulp), olive oil, corn oil, vegetable oil, canola oil, or eggs;

bioengineered cell growth materials;

grasses and other terrestrial vegetation;

bark;

nonwoven microfibers;

cellular absorption swellable materials (such as Drytech® sold by The Dow Chemical Company of Midland, Mich.);

molecular sieve materials (e.g., a desiccant); and hydrophilic powders, like polyacrylic acid or the like.

Another embodiment can be seen in FIGS. 5–9. As seen in FIGS. 5–9, a bilayer single use processing substrate comprises a first two-ply cut-resistant layer 60 and a second two-ply layer 62. The first layer 60 has a first surface area 64 and comprises a tissue ply 66 disposed below a thermoplastic material ply 68. The tissue ply 66 has a thickness in the range of between about 2 and about 6 mils (0.0508 mm–0.1524 mm) and the thermoplastic material ply 68 has a thickness in the range of between about 4 and about 8 mils (0.1016 mm–0.2032). The second layer 62 has a second surface area 70 and comprises a tissue ply 72 disposed above a thermoplastic material ply 74. The tissue ply 72 has a thickness in the range of between about 2 and about 6 (0.0508 mm–0.1524 mm) mils and the thermoplastic material ply 74 has a thickness in the range of between about 1 and about 5 mils (0.0254 mm–0.127 mm). The first layer 60 is disposed atop the second layer 62 such that the first layer tissue ply 66 and the second layer tissue ply 72 are secured to each other by such means as an adhesive or a water soluble polyethylene oxide coating on first and second layer tissue plies 66, 72, and wherein a portion of the second surface area 70 is laterally disposed outside of the first surface area 64.

The adhesive (not shown) can be applied either to the entire surface of the first layer 60 or can be applied in any number of patterns, including without limitation interrupted patterns such as a series of spaced spots and continuous patterns such as parallel stripes or interlocking stripes. One preferred pattern is a series of parallel stripes. It has been found that this pattern adds a capillary effect to the processing substrate by slightly separating the sheets. This separation creates a capillary effect that helps draw liquids away from the surface of the cut resistant layer 60. Also, these parallel stripes channel the liquid toward that portion of layer 62 that is not covered by layer 60 in the preferred embodiment.

Each of the first and second layers 60, 62 can be produced by extrusion coating the thermoplastic material ply onto the tissue ply in a manner similar to the process illustrated in FIG. 4. While the thermoplastic material plies can be formed from any of the thermoplastic materials described above, a preferred material is an isotactic copolymer metallocene polypropylene, wherein the metallocene polypropylene comprises between about 95 and about 99.95, and preferably between about 99.5 and about 99.9 percent by weight of a propylene monomer and between about 0.05 and about 5, and preferably between about 0.1 and about 0.5 percent by weight of an ethylene monomer.

The surface of each thermoplastic material ply can range from smooth to rough. While the two surfaces can both have similar surface characteristics, in one preferred embodiment, the top surface of the cut resistant layer 60 can be smooth and the bottom surface of the second two ply layers can be rough or have a matte appearance. The method of creating these surface effects is well known to those skilled in the art of film production. One method of producing these effects is to use a film casting roll that mirrors the desired roughness of the film. For smooth films, the roll can have a root mean square of about 0.05 to about 5 and for the matte surface the roll can have a root mean square of over about 100.

The most preferred resin composition comprises between about 90 and about 100 percent by weight of the metallocene polypropylene and can further include any combination of the following components: an additive selected from the group of talc, mica, wollastonite, calcium carbonate, barite, glass spheres and fibers, carbon fibers, and ceramic spheres, present in an amount of between about 0 and about 10 percent by weight, a food contact grade alkali metal stearate such as calcium stearate, magnesium stearate and the like or a food contact grade transition metal stearate such as zinc stearate and the like present in an amount of between about 0.01 and about 0.1 percent by weight, and one or more antioxidants, such as Alvinox P, Irgaphos 168, Alkanox 240, Iraganox 3114, Iraganox 1010, Anox IC 14, and Alvinox FB, present in an amount of between about 0 and about 0.25 percent by weight. Small amounts of other additives (nucleation agents, clarifiers and pigments) or processing aids can also be included so long as they do not negatively affect the overall performance properties of the material. Preferably, additives must be approved for direct food contact. It is believed that the talc additive speeds crystalline formation in the polypropylene and improves the cut resistant properties of the polymer, whereas a metal stearate serves as a film lubricant for the polypropylene during processing.

The first layer tissue ply 66 and the second layer tissue ply 72 may be provided by an outside paper provider such as Little Rapids Corporation. Each of the first and second layer tissue plies 66, 72 comprise a virgin hardwood and softwood wood pulp present in an amount of between about 90 and about 100 percent by weight of the tissue, a polyamide or other synthetic fiber present in an amount of between about 0 and about 10 percent by weight of the tissue ply and can include one or more of the following components in trace amounts: a defoamer, a dryer release agent, one or more creping agents, a repulping aid and a bleach neutralizer. The components present in trace amounts are additives which are used as machine runnability aids for the tissue.

The first layer 60 has a surface area 64 less than the surface area 70 of the second layer 62 and is preferably substantially centered on the second layer 62. In a preferred embodiment, the first and second layers 60, 62 have dimensions such that the surface area 64 of the first layer 60 is greater than 50 percent and less than 100 percent of the size of the surface area 70 of the second layer 62. An arrangement of layers can be used wherein first layer 60 is coextensive with the second layer 62 in a first dimension but is smaller than the second layer 62 in the second dimension. Across the second dimension, the first layer 60 can be centered or offset relative to the second layer 62. When the first layer 60 is centered, this forms areas or gutters of similar sizes. Where the first layer 60 is offset relative to the second layer 62 in a second dimension, either a single area or gutter is formed along one edge or two different sized areas or gutters can be formed. The visibility of that portion of tissue ply 72 of second layer 62 which is not covered by first layer 60 provides positive reinforcement to the ultimate user of the processing sheet that the sheet has absorbent as well as protective characteristics.

Figure 10:
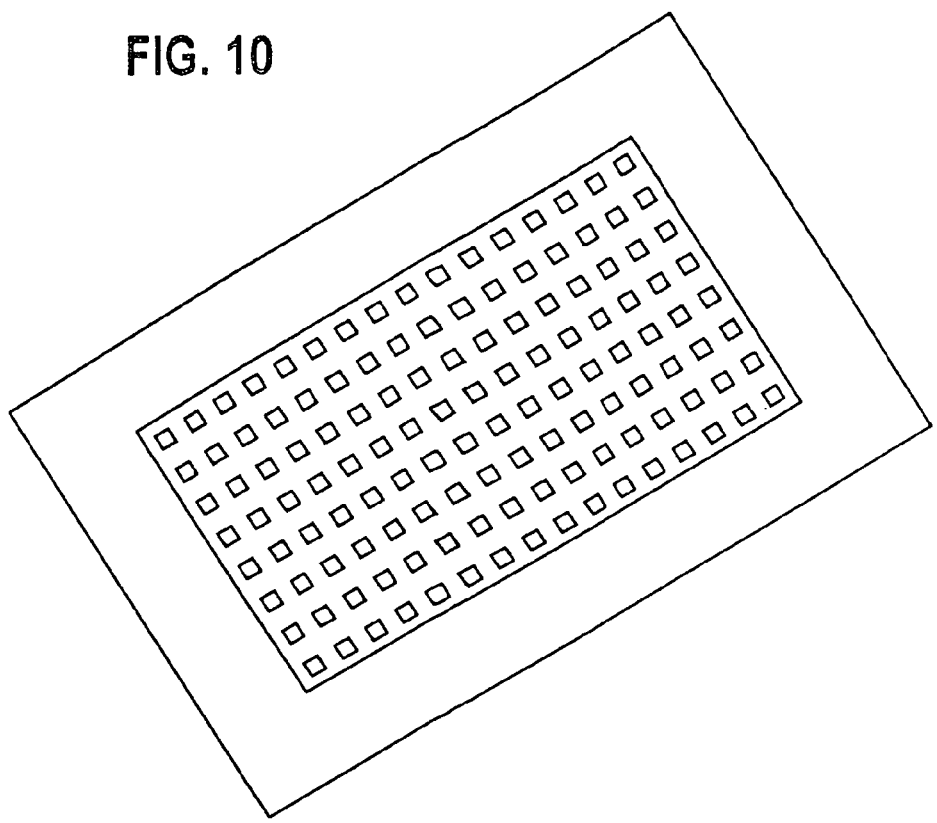
Figure 11:
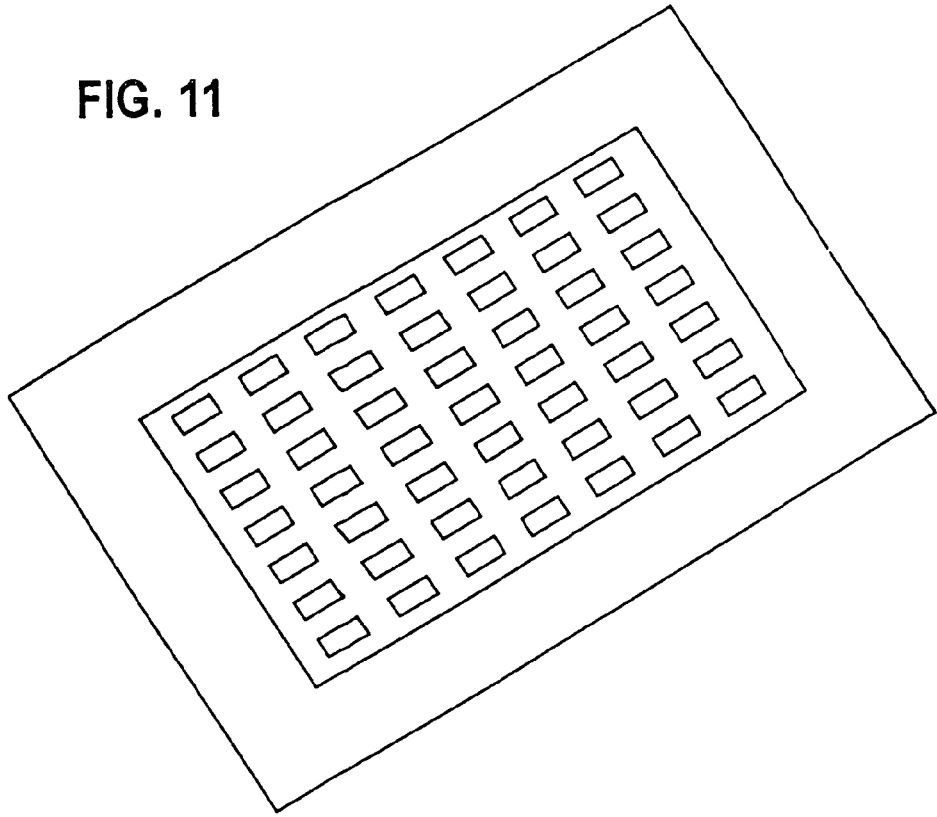
Figure 12:
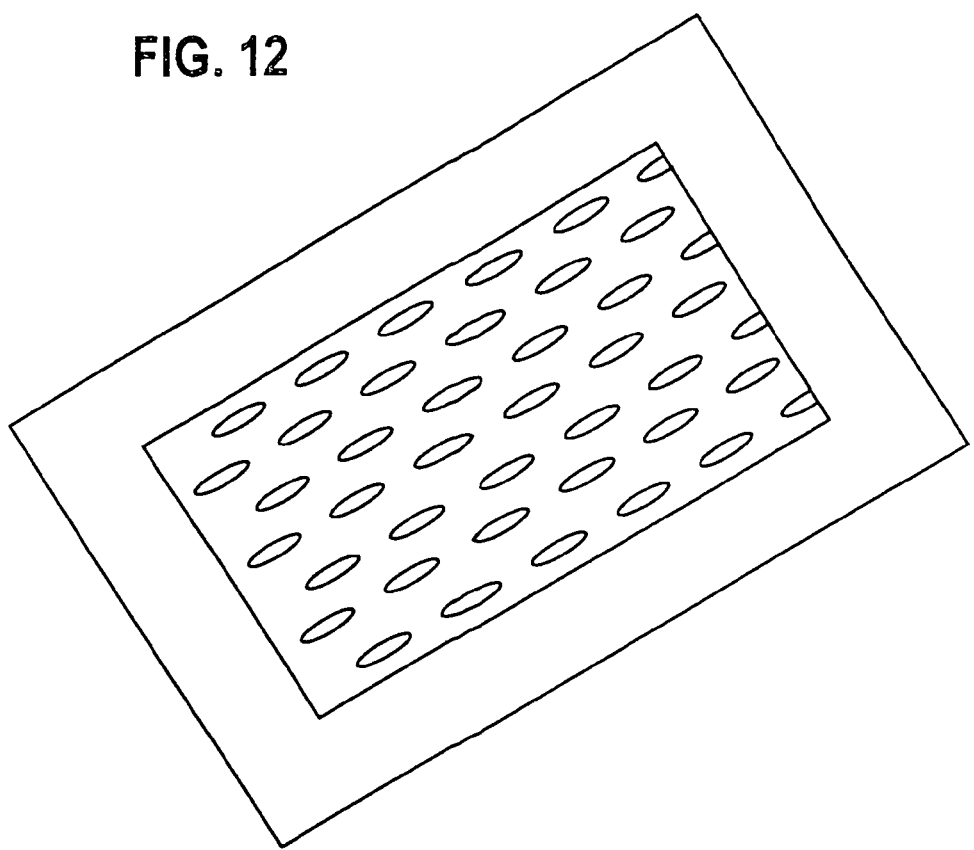
Figure 13:
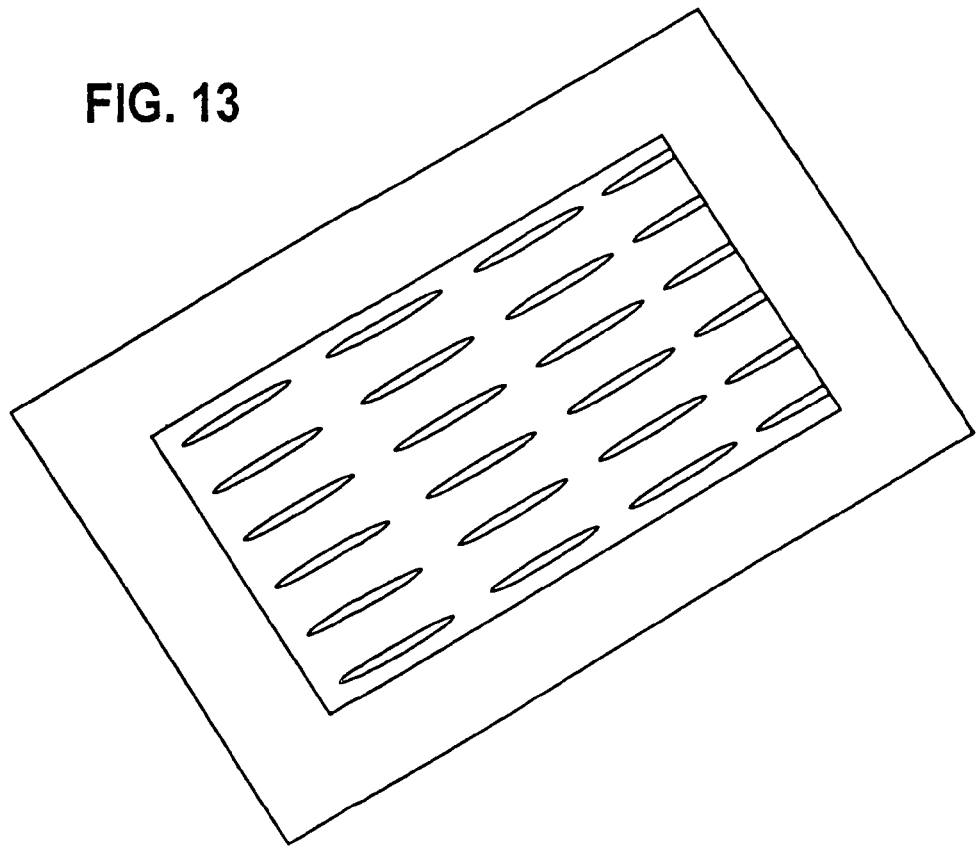

In a commercial embodiment, the substrate may include the first layer 60 having dimensions of between about 6 inches (152.4 mm) and about 14 inches (355.6 mm) by between about 5 inches (127 mm) and about 10 inches (254 mm) and the second layer 62 may include dimensions of between about 10 inches (254 mm) and about 16 inches (406.4 mm) by between about 8 inches (203.2 mm) and about 13 inches (330.2 mm). As seen in FIGS. 6 and 7, the first layer 60 may have regularly spaced apertures 76 therein to permit flow of fluids therethrough. While a preferred arrangement of apertures is a zigzag pattern in the first layer 60, wherein the apertures 76 are separated from one another by between about 0.25 inches (6.35 mm) and about 0.375 inches (9.525 mm) in the x-direction and between about 0.125 inches (3.175 mm) and about 0.75 inches (19.05 mm) in the y-direction, any arrangement and density of these apertures 76 can be used. Alternatively, as shown in FIG. 6a, the arrangement of more numerous apertures 76 may be in an offset row pattern. In such an arrangement, a plurality of straight rows of apertures 76 are offset from each other so that apertures 76 in one row do not line up with the apertures 76 in the adjacent row, thus creating a more condensed zigzag pattern. As shown in FIG. 7, apertures 76 do not extend into or through the second layer 62. The apertures 76 are formed by any suitable process, such as vacuum, needle or water jet perforation, laser, hot pins or mechanical punching, wherein the apertures 76 have a substantially circular geometry and a nominal diameter of between about 0.060 inches (1.524 mm) and about 0.125 inches (3.175 mm). According to the dimensions of the first layer 60 and the number of apertures 76 therein, the average number of apertures 76 per square inch is between about 0 and about 8. The apertures 76 can further have any other geometry such as square or rectangular as seen in FIGS. 10 and 11, respectively. Alternatively, the apertures 76 can be oval or ellipse-shaped as seen in FIG. 12 or may comprise a series of slots as seen in FIG. 13.

As seen in FIGS. 7 and 8, the first surface area 64 and the portion of the second surface area 70 disposed outside of the first surface area 64 may be formed with a pattern or texture 78 by embossing, wherein the step of embossing occurs after the substrate is assembled. This pattern or texture of embossing can be seen on a back surface 80 of the second layer 62 as seen in FIG. 9.

In another embodiment, any of the above disclosed substrates may be delivered to the consumer in roll form as seen in FIG. 14 so that the consumer may cut the product to a desired length and/or shape using a cutter bar, scissors, or knife. In a specific embodiment, the roll 98 is provided in a box (not shown) with a cutter bar and the processing substrate is preferably of the type having a top cut resistant layer 100 with perforated or punched holes 102, a middle absorbent layer 104, and a bottom barrier layer 106. The top and bottom barrier layers 100 and 106 are both made of thermoplastic materials as discussed above. Preferably, but not necessarily, the top and bottom barrier layers 100 and 106 are of the same width W1 that defines the width of the roll and the absorbent layer 104 has width W2 less than the width W1 of the top and bottom barrier layers 100. The layers 100 and 106 are directly sealed together along a length of the roll 98 from the edges of the roll 107 up to a point 108 adjacent the absorbent layer 104. The layers 100 and 106 are sealed together using a heat seal, a bar seal, adhesive, or any other method known in the art.

Preferably, bands of glue 109 are placed across the width of the roll 98 at increments along the roll 98, wherein the glue bands 109 seal the layers 100 and 106 together at points where the layer 104 is interrupted. The roll 98 can be cut or torn along any of the bands 109 to create a processing substrate of a desired length. If the product is cut or torn along a portion proximate to a center of the glue bands 109, the glue bands 109 form a complete seal 110 around the absorbent layer 104 to prevent leakage of fluids out of edges 112 of the processing substrate. If desired, the product may have perforations 114 as seen in FIG. 15 preferably located in the center of the glue bands 109 that allow the consumer to tear off sheets as needed. Alternatively, the product may not include glue bands, and one or more perforations may be disposed at one or more locations and extend through one or more of the layers 100, 104, and 106.

Figure 16:
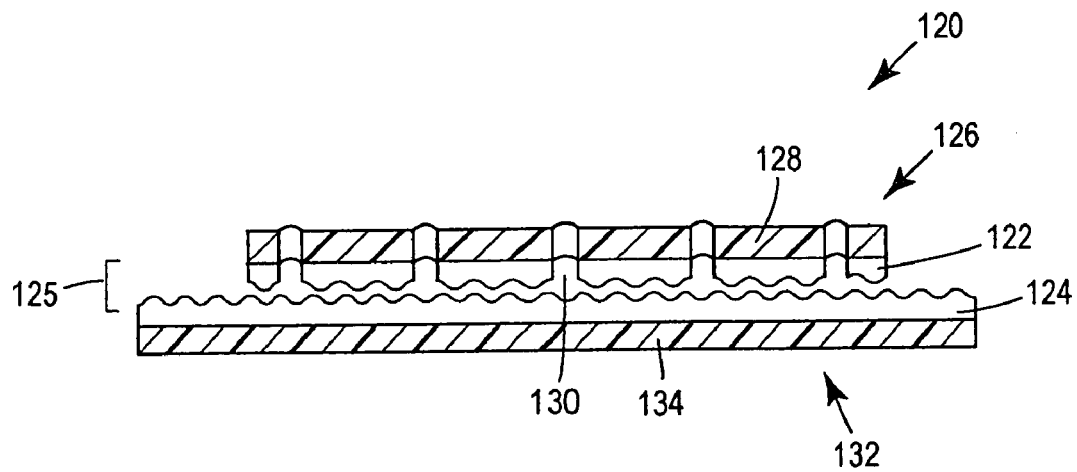
Figure 17:
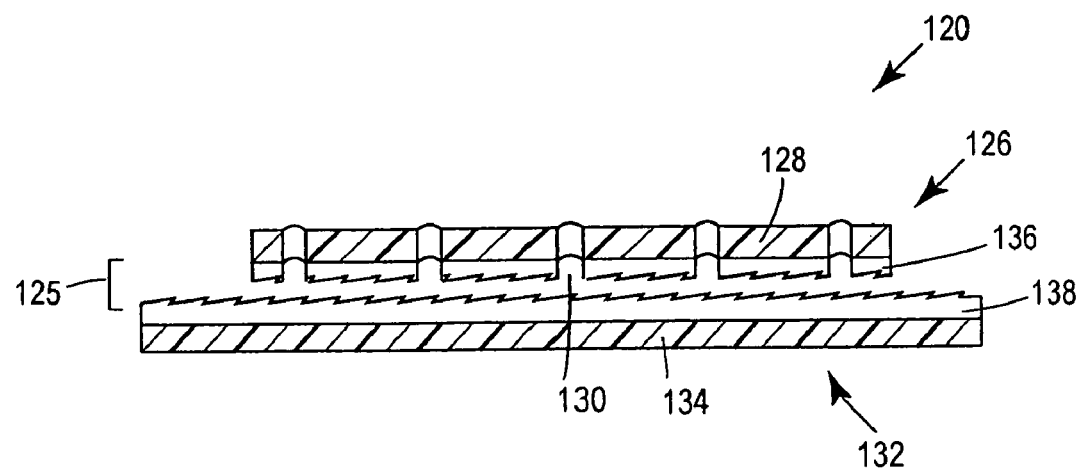

The processing substrate 120 of FIG. 16 is similar to that of FIG. 7 except that the tissue plies 66 and 72 of FIG. 7 are replaced by crepe paper plies 122 and 124 that together form an absorbent layer 125 having an enhanced absorbency. Specifically, a first layer 126 includes a thermoplastic ply 128 disposed above the crepe paper ply 122 wherein holes 130 are formed at spaced locations and extend through at least the thermoplastic ply 128. A second layer 132 includes the crepe paper ply 124 disposed above a thermoplastic ply 134. The crepe paper plies 122 and 124 provide more space for liquids to be held in the absorbent layer 125 of the processing substrate 120. Similarly, as seen in FIG. 17, the tissue plies 66 and 72 may be replaced by plies of a paper material having roughened surfaces 136 and 138 to increase the net thickness and thereby increase the holding capacity of the absorbent layer 125. The roughened surfaces 136, 138 may be formed by picking or lifting the surface of paper stock or brushing the paper stock with a wire roll or other suitable device.

Figure 18:
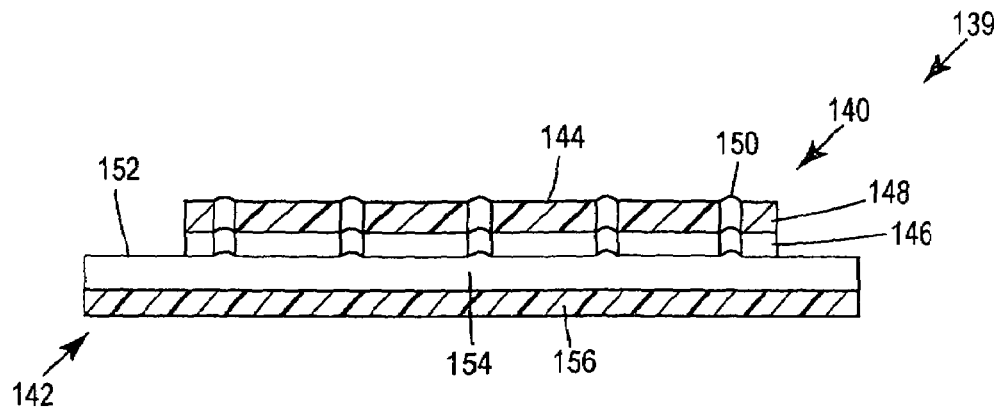
Figure 19:
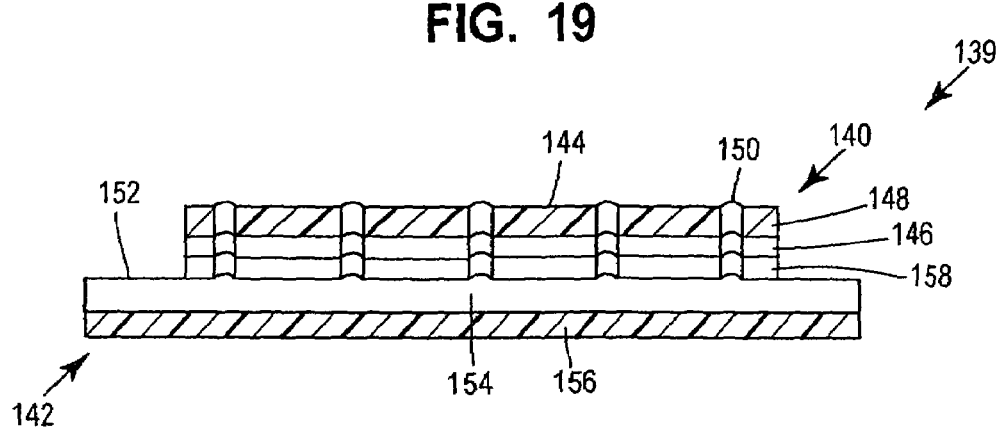

In yet another embodiment, as seen in FIG. 18, a bilayer single use processing substrate 139 comprises a first two-ply cut-resistant layer 140 and a second two-ply layer 142 similar to the embodiment of FIGS. 5–9. The first layer 140 has a first surface area 144 and includes a bottom ply 146 which may be a hydrophilic material such as tissue, an oleophilic material such as a non-woven polypropylene, or a composite oleophilic and hydrophilic material commingled normal to the substrate, for example by needlefelting, hydro entanglement, or pneumatic entanglement, and a top thermoplastic cut resistant ply 148. Apertures 150 preferably extend through the entire first layer 140, but may extend only through the top thermoplastic ply 148 of the first layer 140. Optionally, as seen in FIG. 19, a ply 158 which may be a hydrophilic material such as tissue, an oleophilic material such as a non-woven polypropylene, or a composite oleophilic and hydrophilic material such as a needlefelted composite of such materials may be disposed below the bottom ply 146 of the top layer 140. Further, a ply selected from the same group of materials may be disposed below the top ply 154 of the bottom layer 142.

Other oleophilic materials include THINSULATE® by 3M®, polyester, finely spun polyolefins, materials coated with clays, or any other known materials, wherein the oleophilic material absorbs oil based liquids, such as grease from fried foods. The second layer 142 has a second surface area 152 that is preferably (although not necessarily) larger than the first surface area 144 and includes a top ply 154 which may be a hydrophilic material such as tissue, an oleophilic material such as those disclosed above, or a composite oleophilic and hydrophilic material as discussed above, disposed atop a thermoplastic barrier ply 156. The thermoplastic material and tissue plies of both layers have thicknesses identical or similar to like layers of FIGS. 5–9. The layer 140 may be centered atop the layer 142 and may be adhered or otherwise joined thereto. It is advantageous in the embodiments of FIGS. 18 and 19 to place an oleophilic layer above a hydrophilic layer, but is not necessary.

Any of the embodiments as disclosed herein may include an odor absorbing material within or applied to one or more of the layers. For example, an odor absorbent compound may be impregnated or otherwise added to either or both of the tissue plies, the crepe paper plies, the roughened paper plies or any other portion of the absorbent layer(s) of the processing substrate. Suitable odor absorbing materials include baking soda, activated carbon, talc powder, cyclodextrin, ethylenediamine tetra-acetic acid, zeolites, antimicrobial agents, activated silica, activated charcoal, or any other materials known in the art. In order to preserve the odor absorbing capacity of the absorbent layer 170 before consumer use, one or more strips of tape 172 can be attached to the top layer 174 of the processing substrate 176 as seen in FIG. 20. The strip(s) of tape 172 include a relatively low-tack adhesive and cover some or all the holes or apertures 178 in the top layer 174 of the processing substrate 176 to keep the substrate 176 from absorbing odors prior to use. The strip(s) 172 are removed when a consumer is ready to use the processing substrate 176.

Also, any or all of the layers of any of the embodiments disclosed herein may be tinted or otherwise processed to change color when liquid is exposed thereto. For example, the bottom thermoplastic layer of any of the embodiments presented herein may be tinted almost any color so that, when the absorbent layer becomes wet and changes from opaque to translucent or nearly transparent, the color of the thermoplastic layer below the absorbent layer will become apparent. A medium tint of any color (e.g., purple or blue) works most appropriately because the color cannot be seen through the absorbent layer when the absorbent layer is dry, but the color can be seen when the absorbent layer is wet. Alternatively, a slighty darker tint of color may be used wherein the color can be seen lightly through the absorbent layer when dry, but is much darker when the absorbent layer is wet.

Any of the processing substrates as disclosed herein may also include a cut-through indicator as seen in FIG. 21. In a preferred embodiment, a processing substrate 192 includes a first two-ply cut-resistant layer 194 having a tissue ply 196 disposed below a thermoplastic ply 198. The first two-ply layer 194 is disposed above a second two-ply layer 200 that includes a tissue ply 202 disposed above a thermoplastic ply 204, similar to the processing substrate of FIG. 7. The processing substrate 192 further includes a tissue layer 206 disposed below the thermoplastic ply 204 of the second two-ply layer 200. The tissue layer 206 may be a paper having a basis weight of 20 pounds per 3000 ft$^2$, but is preferably a paper having a basis weight of about 10 pounds per 3000 ft$^2$. The thickness of the tissue layer 206 is between about 2 mils and about 6 mils thick (0.0508 mm–0.1524 mm). In the event that a user has cut through the plies 196, 198, 202, and 204, liquid exuded by the food being cut will be absorbed by the tissue layer 206. This absorption can readily be seen by the user so that the user can dispose the damaged substrate before damage to the underlying surface occurs and/or a mess has been made.

In another modification, the processing substrate shown in any of the previously discussed FIGS. can be improved to increase the flow of fluid across the substrate, thereby allowing for more effective absorption of fluids into the absorption layer. For example, in the embodiment seen in FIGS. 6 and 7 the thermoplastic material ply 68 (or any other ply and/or layer) can be treated with a wetting agent, such as Dow Corning® Q2-5211 Superwetting agent. This treatment could be accomplished before, during, or after assembly of the substate layers, and preferably prior to assembly thereof. Alternatively, the thermoplastic material ply 68 (or any other ply and/or layer) could be treated with a hydrophilic additive, such as Hydrophilic Concentrate VW351 from Polyvel, Inc, of Hammonnton. N.J. Another option is to utilize an anti-fogging agent, such ChemStat AF-1006 from Rutgers Organics of State College, Pa. Preferably, any wetting agent, hydrophilic additive, or anti-fogging agent is of a food grade. In another alternative, the thermoplastic material ply 68 is corona treated (preferably prior to assembly of the layers), which serves to decrease the surface tension of a liquid on the top layer 60 so that such liquid readily flows into the absorbent portions of the processing substrate.

The plies and layers of the foregoing embodiments are produced via known extrusion methods. A first sheet is produced having a cut resistant ply and an absorbent ply. Preferably, the cut resistant ply is treated before the two plies are combined. Referring now to FIG. 22, an apparatus for and method of applying a wetting agent, hydrophilic additive, or anti-fogging agent 256 to the thermoplastic material ply 68 is shown. The ply 68 is extruded by an extrusion apparatus 250 onto a chilled casting roller 252. After being chilled by the casting roller 252, the ply 68 traverses a path 253 to a pair of nip rollers 254. Spray nozzles 258 disposed along the path 253 spray a wetting agent or hydrophilic additive 256 onto the ply 68. Excess spray from the process can be collected in a collecting tray 259 and reprocessed. Once the ply is treated, the cut resistant ply and absorbent ply are combined to form a first sheet. A second sheet having a liquid impermeable sheet is then attached, preferably by an adhesive, to the absorbent ply of the first sheet. Alternatively, the second sheet also has an absorbent ply and the two absorbent plies are attached together.

In an alternative method of application shown in FIG. 23, the ply 68 is immersed in a liquid bath 260 containing a wetting agent, hydrophilic additive, or anti-fogging agent 256. Specifically, the ply 68 is removed from the casting roller 252 by a pair of nip rollers 254. The pair of nip rollers 254 directs the ply 68 into the liquid bath 260. Once in the liquid bath 260, the ply 68 is immersed in the wetting agent or hydrophilic additive 256 and contacts secondary rollers 255 that direct the ply through the liquid bath 260 and into a vertical exit path 261. Because the ply 68 exits the liquid bath 260 along the vertical exit path 261, any excess wetting agent, hydrophilic additive, or anti-fogging agent 256 can easily return to the liquid bath 260.

In yet another embodiment as seen in FIG. 24, a processing substrate 262 may include a first layer 264 of a paperboard material and a second polymeric layer 266 disposed below the first layer 264 and which is impervious to liquids. Preferably, although not necessarily, the first and second layers 264 and 266, respectively, are the same size.

The paperboard material of the first layer 264 preferably, although not necessarily, has a dry basis weight of at least 150 pounds per 3000 ft$^2$, and more preferably a dry basis weight of at least 200 pounds per 3000 ft$^2$. Although paper is not inherently cut resistant, high dry basis weight paperboards begin to exhibit some cut resistant properties. Any of the polymeric materials disclosed above can be used to form the second polymeric layer 266, but low density polyethylene and polypropylene are preferred materials. The thickness and sizes of the first and second layers 264 and 266, respectively, are similar to equivalent layers of the embodiments discussed herein.

A still further embodiment utilizes different adhesive patterns to improve liquid flow from the surface of the substrate. One such adhesive pattern is discussed above in relation to FIGS. 5–9. FIG. 25 illustrates another adhesive pattern wherein the adhesive lines of FIGS. 5–9 extending continuously from side-to side of the first layer 60 are replaced by discontinuous adhesive segments 300. The adhesive segments 300 can be disposed in any regular or irregular (including random) pattern. In the illustrated embodiment, the adhesive segments 300 are substantially all of the same length and width and are disposed substantially parallel to one another in a regular pattern with the apertures 76 to form alternating rows of apertures 76 and segments 300. Preferably, a regular spacing exists between apertures in an x-direction and a y-direction such that rows of apertures are formed. Also preferably, each row of segments 300 is disposed at a location equidistant to adjacent rows of apertures 76 (except at the top and bottom edges of the layer 60) and each row of apertures 76 is disposed substantially equidistant adjacent rows of segments 300 (again, except at the top and bottom edges of the layer 60), as seen in FIG. 25. Thus, for example, a first row 303*a* comprising a series of segments 300*a*1–300*a*23 is disposed in a linear fashion substantially midway between rows 301*a* and 301*b* of apertures 76. Similarly, a second row 303*b* comprising a further series of segments 300*b*1–300*b*24 is disposed in a linear fashion substantially midway between rows 301*b* and 301*c* of apertures 76. The segments 300*a*1–300*a*23 are offset from left-to-right as seen in FIG. 25 with respect to the segments 300*b*1–300*b*24. Preferably, each aperture 76 is disposed above (as seen in FIG. 25) a gap between adjacent ones of the segments 300 in the segment row immediately below the aperture 76. In addition, each aperture 76 is disposed below a midpoint of a segment 300 in the segment row immediately above the aperture 76. Each of the segments 300 has an effective length (i.e., a side-to-side dimension or extent as seen in FIG. 25) less than the width W of the layer 60, and, more preferably, greater than the distance between adjacent segments 300 of each row of segments 300. The segment and aperture patterns described above are repeated over the entire surface area of the layer 60. The combination of the segment pattern and the aperture pattern results in an advantageous ready dispersion of liquid into the absorbent plies of the processing substrate as discussed above. This advantage of this embodiment results from the ability of the liquid to flow from an aperture 76 not only between adjacent rows of segments 300, but also through spaces between individual segments 300 of a row.

In an alternative embodiment, the adhesive portions could be applied to the sheet in continuous lines and then areas of those lines between the adhesive segments 300 may be removed or rendered ineffective as an adhesive prior to securing the layers together. As in the previous embodiment, this results in a processing substrate wherein liquid can flow through the absorbent plies between adhesive segments of the same row, as well as in the spaces between rows of adhesive segments. Thus, liquid can spread in as many directions as possible from the apertures 76.

Also shown in FIG. 25 are two border adhesive strips 304 disposed parallel with and extending the width of the first layer 60. While the border adhesive strips 304 strengthen the edge bond between layers they are not a requirement. Also, as shown in FIG. 26, there may be two additional border strips extending the length of the first layer 60 to provide additional strengthening of the layer edge bond.

Referring now to FIGS. 27 and 28, methods for applying the adhesive to the substrate are shown. The first layer 60 and second layer (not shown) are produced as discussed above. Then the adhesive segments 300 are applied. In FIG. 27 the adhesive segments 300 are applied to the tissue or liquid absorbent ply 66 of the first layer 60. The application method includes the step of using an applicator 310 to deposit regular sized portions of adhesive onto the first layer 60 at regular intervals. The second layer is then attached to the tissue ply 66. Alternatively, the adhesive could be applied to the second layer in a similar manner and the layers and can be assembled together.

FIG. 28 shows a different method for applying adhesive. In this method the adhesive 301 is applied in continuous strips 312 and then portions 302 of the strips 312 are removed or rendered ineffective by a roller 316. The roller 316 includes circumferentially spaced lands or ridges 318 that extend outwardly from a main roller body 320. The ridges 318 are brought into contact with the first layer 60 as the roller 316 is rotated and the strip 312 of adhesive 301 is removed or rendered ineffective (i.e., non-flowable and/or non-sticky) where the ridge 318 makes contact therewith. This can be accomplished in a variety of ways. In one embodiment, simple contact and/or compression by the ridge 318 causes the adhesive to be driven into the absorbent ply of the layer away from the surface thereof. Alternatively, such contact and/or compression may cause the adhesive to adhere to the ridge 318 and to be removed from the first layer 60. The portions may be removed from the ridges 318 by cryogenic cleaning using dry carbon dioxide or nitrogen. In a further embodiment, a chemical or other agent carried by the ridges bonds with the adhesive 301 so that the adhesive is unable to adhere to another object. This agent could be of an organic or inorganic nature such as: talc; a silicon dioxide powder; flour or other starch composition; sawdust; paper fibers; a silicone mold release agent; or any anti-stick compounds such as canola oil, cooking sprays, or a TEFLON® agent. In any case, one or more portions 302 of each strip 312 are "deactivated" as noted above (i.e., rendered ineffective) so that when the first and second layers are assembled together, the adhesive in the deactivated zones fails to spread into the absorbent ply of the adjacent layer at such locations, thereby preventing the formation of liquid impervious zones at the areas where the ridges contacted the adhesive strip. As a result, liquid subsequently applied to the substrate liquid can spread out in a substantially radial pattern from each aperture.

Any other suitable method of removing or "deactivating" the adhesive can be used, as desired, to produce one or more discontinuous adhesive segments each having effective side-to-side dimensions (as seen in FIGS. 25 and 26) less than the width of the sheet 60. If desired, as seen in FIGS. 25 and 26, the segments may be separated from one another by distances less than the lengths of the segments.

As seen in FIGS. 29 and 30, a processing substrate 338 may include an absorbent material layer 340 and randomly spaced strands of material 342 that are substantially continuous and preferably a thermoplastic material disposed on a first side 344 of the absorbent material layer 340. The randomly spaced strands 342 preferably provide a top surface that is cut resistant and liquid pervious. Almost any type of thermoplastic material can be used to form the randomly space strands 342, including but not limited to, polyolefins such as polyethylene and polypropylene, polyvinyl chloride, polycarbonate, polylactic acid, thermosetting materials, or any type of thermoplastic material with an additive or filler such as clay. Note that non-thermoplastic materials are possible, but may not provide the necessary cut resistant properties. The strands 342 may further be almost any size in diameter ranging from about 20 microns to about 4 mm, depending on the use of the processing substrate.

The processing substrate 338 may also include a barrier layer 346 attached to a second side 348 of the absorbent material layer 340 as seen in FIG. 31. The barrier layer 346 comprises a single polymeric or thermoplastic material ply 350, as discussed in detail above. Alternatively, as seen in FIGS. 32 and 33, the barrier layer 346 includes a polymeric or thermoplastic material ply 350 disposed below an absorbent material ply 352, also discussed in detail above. Further, the randomly spaced strands 342 and absorbent layer have a surface area 354 that is smaller than a surface area 356 of the barrier layer 346.

The method of producing the processing substrates of FIGS. 29–33 as seen in FIG. 34 includes the steps of providing the absorbent material layer 340 and moving the absorbent material layer 340 in a first direction 360. Thereafter, the method includes the step of depositing the randomly spaced strands of thermoplastic material 342 onto the first side 344 of the absorbent material layer 340 to form the necessary surface thereon. As the absorbent material layer 340 moves in the first direction past an extrusion die 362, the randomly spaced strands 342 are deposited through multiple spinnerets or small orifices 364 onto the first side 344 of the absorbent material layer 340. The randomly spaced strands 342 may be deposited on the entirety of the absorbent material layer 340 or a smaller portion of the absorbent material layer 340 as seen in FIGS. 32 and 33.

The extrusion die 362 is fixed relative to the first direction but may move with respect to a second direction 366 that is perpendicular to the first direction. Preferably, the extrusion die 362 rotates and oscillates as it is extruding the strands 342 onto the absorbent material layer 340 to create the randomized pattern of strands 342. Optionally, several extrusion dies 362 may be used at various points in the path of the moving absorbent material layer 340. Still further, air pressure through the use of pneumatic air devices may be used to manipulate the division of the strands of material 342.

Thereafter, the randomly spaced strands 342 may optionally be calendared to form flattened strands with spaces or voids therebetween. This step creates a flattened surface and fills in some of the void space between strands 342. Also optionally, a barrier layer 346 may be joined to the second side 348 of the absorbent material layer 340 by extrusion coating, adhesive, or any other process as discussed in detail above. As also discussed above, the barrier layer 346 may comprise a single thermoplastic ply 350, a thermoplastic ply 350 disposed below an absorbent ply, or any other combination of layers or plies.

According to a further embodiment as seen in FIGS. 35–37, a polymeric sheet material 400 may be used to configure a processing substrate 402 for preparation of food or other articles thereon. The polymeric sheet material 400 generally includes a liquid pervious top or upper section 404 having a cut resistant upper surface 414, and a liquid impermeable bottom or lower section 406 that is integral with the upper section 404. Preferably, the width W3 of the upper section 404 and the width W4 of the lower section 406 are equal, but it is possible that one of the widths W3, W4 is larger than the other. Also preferably, both the upper and lower sections 404 and 406, respectively, are made of any of the thermoplastic materials discussed in detail above. They are preferably the same material but may be manufactured of different materials to vary the characteristics of the upper and lower sections 404 and 406.

A consumer preferably would configure the processing substrate 402 by folding the upper section 404 over the lower section 406 along a fold line 408. Optionally, the fold line 408 may be in the form of a score line to facilitate the folding process. If a score line is used, grooves are formed in the polymeric sheet material 400 along the fold line 408 for ease in folding. Depending on the level of absorbency desired, absorbent material 410, such as one or more paper towels, may thereafter be inserted between the upper and lower sections 404 and 406 of the processing substrate 402 to absorb liquids generated during the use of the processing substrate 402.

The cut-resistant upper section 404 is preferably made of a layer sufficiently durable to withstand aggressive cutting of meats, vegetables and other food items by a serrated or non-serrated blade. Preferably, the upper section 404 includes a plurality of spaced apart apertures 412 to permit the passage of liquids through the upper section 404 into the absorbent material 410 when configured as a processing substrate 402. The apertures 412 may be formed by punching, perforating, or any other means known in the art and may have any pattern as discussed above.

Also, it is generally preferred that the upper section 404 have a roughened or textured upper surface 414 to prevent slippage of items during processing of items thereon. A lower surface 416 of the upper section 404 may also be roughened or textured to help secure the absorbent material 410 in place within the folded processing substrate 402. The roughened or textured surfaces may be created using techniques, such as embossing, creating a pattern thereon, or any other techniques discussed herein or known in the art.

The lower section 406, is preferably made of a liquid and bacteria impermeable material to prevent leakage of liquids and transfer of bacteria onto a work surface. The lower section 406 is preferably made of a slip-resistant material to prevent slippage of the processing substrate 402 on the work surface. Alternatively, a lower surface 418 of the lower section 406 may be roughened or textured similar to that of the lower surface 416 of the upper section 404 to prevent slippage of the lower section 406 of the processing substrate 402 on the work surface. An upper surface 420 of the lower section 406 may also be roughened or textured to secure the absorbent material 410 in place within the processing substrate 402. The roughened or textured surfaces may be created using techniques described in detail above. If multiple surfaces are roughened or textured, they may have the same roughness or texture or different roughnesses or textures.

In yet another embodiment, an adhesive may be applied to the lower surface 418 of the lower section 406 such that the lower surface 418 adheres to a work surface wherein the processing substrate 402 is used, thereby preventing slippage of the processing substrate 402 during processing thereon. Optionally, the adhesive may be applied to the upper surface 420 of the lower section 406 such that when the absorbent material 410 is inserted between the upper section 404 and lower section 406, the absorbent material 410 adheres to the upper surface 420 of the lower section 406, thereby minimizing slippage of the absorbent material 410 during food processing. As described previously, the adhesive may be applied to either the lower surface 418 and/or upper surface 420 of the lower section 406 in any number of patterns, including without limitation, interrupted patterns such as a series of spaced spots and continuous patterns such as parallel stripes or interlocking stripes.

The polymeric sheet material 400 may be extruded with a uniform thickness across both the upper and lower sections 404 and 406, respectively. Alternatively, the polymeric sheet material 400 may be extruded to produce upper and lower sections 404 and 406 having different thicknesses. For the example, the cut-resistant upper section 404 may range from about 2 mils (0.0508 mm) to about 9 mils (0.2286 mm) in thickness and the liquid-impermeable lower section 406 may range from about 2 mils (0.0508 mm) to about 9 mils (0.2286 mm) in thickness.

In another embodiment as seen in FIG. 38, a polymeric sheet material 400 includes an upper section 404 with a textured lower surface 416 and/or a lower section 404 with a textured upper surface 420. The consumer preferably would fold the upper section 404 over the lower section 406 along the fold line 408, thereby placing the textured surfaces in contact with each other to create the processing substrate 402. The texture of the upper surface 420 and/or lower surface 416 facilitate the retention of waste liquids therebetween during the food preparation process, thereby eliminating the need for inserting absorbent material within the folded processing substrate 402.

In another embodiment as seen in FIG. 39, the polymeric sheet material 400 of FIG. 35 may be delivered to the consumer in a roll 422 similar to that of FIG. 14. The consumer may cut a portion of the polymeric sheet material 400 from the roll 422 at a desired length and/or shape using a cutter bar, scissors, or knife. Preferably, the roll 422 includes perforations 424 at spaced locations so that the roll 422 can be cut or torn along any of the perforations 424 to create a processing substrate of a desired length. Thereafter, the consumer preferably would fold the sheet along the fold line 408 disposed along a length L of the roll 422 to process items thereon.

Further specific examples of structures are given below:

Example 1—a trilayer structure wherein the layer 16 comprises 5 mil (0.127 mm) thick PP, filled with up to 40% mica and including 1/32" diameter holes with 9 holes/square inch. The layer 18 is a 37# airlaid cellulose mat thermally laminated to a 5 mil (0.127 mm) thick PP backing sheet comprising layer 20. The layer 16 is thermally bonded to the layer 18.

Example 2—a bilayer structure comprising a nonwoven polyolefin fabric upper layer point bonded to a second layer of polymeric film that functions both as a barrier and as a cut resistant surface. During manufacture a food-contact approved surfactant may be applied to the upper layer to provide a desired hydrophilic characteristic.

Example 3—a scrim made of any of a variety of materials, such as a thermoplastic or thermosetting polymeric material having voids between portions of material is post-filled with absorbent material, such as cellulose, using any suitable post-filling process, such as a wet-laid process or a vacuum process, to form a mat. A barrier layer of any suitable material (e.g., PP or PE) is thereafter applied in any suitable manner, such as by extrusion lamination, to an undersurface of the mat and the mat is thereafter subjected to an embossing process either while the barrier layer is still partially molten and/or as heat is applied to cause the barrier layer to bond securely to the scrim.

Example 4—a bilayer single use processing substrate comprises a first layer 60, wherein the tissue ply 66 is 2.5 mils (0.0635 mm) thick and the thermoplastic material ply 68 is 5 mils thick (0.127 mm). The second layer 62 has a tissue ply 72 which is 2.5 mils (0.0635 mm) thick and a thermoplastic material ply 74 which is 3.5 mils (0.0889 mm) thick, wherein the first layer 60 is secured atop the second layer 62 by an ethyl vinyl acetate adhesive.

Each of the thermoplastic material plies consists of a resin comprising an isotactic copolymer metallocene polypropylene, wherein the metallocene polypropylene comprises 99.9 percent by weight of a propylene monomer and 0.1 percent by weight of an ethylene monomer. The resin comprises 93.873 percent by weight of the metallocene polypropylene, 6.050 percent by weight of a talc additive, 0.055 percent by weight of calcium stearate, 0.011 percent by weight of a primary antioxidant, and 0.011 percent by weight of a secondary antioxidant.

The first and second layer tissue plies 66, 72 comprise 98 percent by weight of a virgin hardwood and softwood wood pulp, 0.2 percent by weight of a polyamide wet strength resin and trace amounts of a defoamer, a dryer release agent, two creping agents, a repulping aid and a bleach neutralizer.

The first layer 60 has dimensions of 9.75 inches (247.65 mm) by 7.688 (195.275 mm) inches and the second layer 62 has dimensions of 11.75 (298.45 mm) inches by 9.688 inches (246.075 mm). The first layer 60 includes 414 regularly spaced apertures created by having a nominal diameter of 0.08 inches (2.032 mm), wherein the apertures form a zigzag pattern and are separated from one another by 0.279 inches (7.0866 mm) in the x-direction and 0.165 inches (4.191 mm) in the y-direction. The average number of apertures per square inch is 5.52.

The first surface area 64 and the portion of the second surface area 70 disposed outside of the first surface area are embossed with embossing pattern 78.

One or more of the following benefits may be obtained, depending upon the choice of material(s), properties and material amounts:

1. the sheet absorbs food juices while cutting and reduces resulting mess;

2. the sheet is easy to dispose of;

3. the sheet reduces or even prevents accidental germ/microbial contamination because the germs from one food item will not get transferred to another if the cutting sheet is disposed of after use;

4. the sheet provides cut resistance, i.e., it helps reduce any cut damage to the kitchen or other work surface;

5. the sheet does not allow food juices to run all over the work surface;

6. the sheets may be provided in varying sizes to suit the cutting or other task;

7. the sheet may be used on top of a cutting board or directly on the work surface;

8. the sheet reduces slippage, by providing a skid-resistant contact with the work surface;

9. after cutting, one need only lift the sides of the sheet to funnel food into a cooking pot;

10. the sheet can be set on a surface to catch debris and grease;

11. the sheet is easily rolled up with waste captured therein and disposed of in the trash can;

12. since each sheet is clean the need for repeated cleaning of the cutting board or other work surface is avoided;

13. the sheet can be used to cut or process any food or other material including meat, chicken, fish, soft or hard fruits and vegetables, dough, etc.;

14. unlike using a paper towel, the sheet does not permit fiber and lint to become attached to the food being cut;

15. the sheet does not transfer any smell or taste to the product being cut or otherwise processed (alternatively, the sheet could be impregnated with a desirable scent, such as lemon, which is then transferred to the item being processed);

16 the sheet manages bacteria by absorption, containment and barrier rather than by the use of added chemicals;

17. the sheet can be made food contact approved;

18. the top surface reduces slippage of food while cutting;

19. the cutting surface will not dull knives like some hard cutting surfaces;

20. the sheet is hygienic;

21. the sheet may be formed with at least one and, preferably multiple absorbent edges that give an extra measure of security to manage bacteria-borne juices;

22. the sheet offers superior food/surface protection for non-cutting food preparation applications;

23. the sheet affords an easy, convenient medium for in-home or out-of-home, recreational and outdoor uses;

24. the sheet can be cut by consumers to other sizes and/or shapes;

25. the sheet can be held in place on countertops by a few drops of water;

26 the sheet protects the countertop and food from potentially deadly pathogens that cannot be seen;

27 the sheet allows safer food preparation for the consumer and the consumer's family by reducing the risk of food-borne illness;

28. the sheet can reduce food preparation time;

29 the profile and/or texture of the cutting surface can be customized to provide benefits not practical in conventional cutting surfaces or boards simply because such articles would be difficult or impossible to wash;

30 the sheets do not take up room in the dishwasher or in the bags and wraps drawer of the kitchen;

31. in alternative embodiments bacteria borne liquids are securely trapped in cells and/or a layer below the cutting surface;

32. the sheet may be constructed so that the consumer can see the absorption of liquid;

33. the sheet may be made to have a clean hygienic appearance;

34. the sheet may have a decorative appearance that is printed and/or embossed as desired;

35. the sheet absorbs like a paper towel, but has the additional advantages of barrier and cut resistance;

36. the sheet has additional uses, for example, as a placemat, as counter protection for use around stove/cook top, bin/shelf protection in refrigerator, under dog or cat dish, under plants, under large serving dishes, etc . . . ;

37. in some embodiments the sheet has a place to wipe a knife on;

38. the sheet can make a desirable addition to a picnic basket;

39. the sheet can be used to line a refrigerator meat tray;

40. the sheet absorbs and contains all juices from defrosting meat;

41. the sheet can contain odors from foods, such as fish;

42. the sheet can be used on dishes and platters to prevent scratching of same by knives;

43. the sheet can be placed under sticky and dripping containers in refrigerator;

44. the sheet does not fall apart like paper towels; and 45. the sheet could be used as a drawer liner or as a mat to do art projects on.

INDUSTRIAL APPLICABILITY

The present invention is not limited to the concept of utilizing and constructing disposable, absorbent barrier surfaces in place of and/or in conjunction with conventional cutting boards, but encompasses all food handling, article support and barrier/isolation applications where absorbent, liquid/bacteria barrier management is desirable and methods for making the same.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out the same. The exclusive rights to all modifications which come within the scope of the appended claims are reserved.

We claim:

1. A disposable cutting sheet for cutting and preparation of food items thereon, comprising:
   a first section having a plurality of apertures therethrough and a cut resistant surface;
   a second liquid impermeable section disposed adjacent the first section;
   a fold line disposed between the first section and the second section, wherein folding along the fold line forms the cutting sheet; and
   an absorbent material wherein the first and second sections are folded along the fold line and moved relative to one another to form a pocket therebetween wherein the of an absorbent material is disposed in the pocket between the first and second sections; and
   wherein one of a surface of the first section that faces the absorbent material in a folded position and a surface of the second section that faces the absorbent material in the folded position is roughened or textured in order to prevent slippage of the absorbent material within the sheet when folded.

2. The cutting sheet of claim 1, wherein the fold line comprises a score line.

3. The cutting sheet of claim 1, wherein the first section comprises a thermoplastic ply.

4. The cutting sheet of claim 1, wherein the second section comprises a thermoplastic ply.

5. The cutting sheet of claim 1, wherein the cut resistant surface is a textured surface.

6. The cutting sheet of claim 1, wherein a surface of the first section that faces the absorbent material in a folded position is a textured surface.

7. The cutting sheet of claim 1, wherein a lower surface of the second section is a slip resistant surface.

8. The cutting sheet of claim 1, wherein an adhesive is applied to a lower surface of the second section.

9. The cutting sheet of claim 1, wherein an upper surface of the second section is a textured surface.

10. The cutting sheet of claim 1, wherein an adhesive is applied to an upper surface of the second section.

11. The cutting sheet of claim 1, wherein the thickness of the first section is between about 2 mils (0.0508 mm) and about 9 mils (0.2286 mm).

12. The cutting sheet of claim 1, wherein the thickness of the second section is between about 2 mils (0.0508 mm) to and about 9 mils (0.2286 mm).

13. The cutting sheet of claim 1, wherein a width of the first section is substantially equal to a width of the second section.

14. The cutting sheet of claim 1, wherein a width of the first section is less than a width of the second section.

15. The cutting sheet of claim 1, wherein folding the cutting sheet along the fold line disposes the first section substantially over the second section.

16. The cutting sheet of claim 1, wherein the first and second sections are formed into a roll.

17. A disposable cutting sheet for cutting and preparation of food items therein comprising:
   a sheet having opposite front and back sides;
   a first section of the sheet including a cut resistant surface ply on the front side thereof and having a plurality of apertures therethrough;
   a second section of the sheet being liquid impermeable; and
   a fold between the first and second sections; and
   an absorbent materials wherein the sheet has an unfolded position and a folded position about the fold, and wherein the back side of the first section opposes the back side of the second section when the sheet is in the folded position;
   wherein a surface of the liquid impermeable section that is facing the cut resistant section in the folded position and which is opposite the back side of the liquid impermeable section is roughened or textured to prevent slippage of the absorbent material that disposed between the first and second sections in the folded position.

18. The cutting sheet of claim 17, wherein the fold comprises a score line.

19. The cutting sheet of claim 17, wherein the first section comprises a thermoplastic ply.

20. The cutting sheet of claim 17, wherein the second section comprises a thermoplastic ply.

21. The cutting sheet of claim 17, wherein a width of the first section is substantially equal to a width of the second section.

22. The cutting sheet of claim 17, wherein a width of the first section is less than a width of the second section.

23. The cutting sheet of claim 17, further including an absorbent material disposed between the first and second sections when the cutting sheet is folded.

* * * * *